(12) United States Patent  (10) Patent No.: US 11,815,902 B2
Kim et al.  (45) Date of Patent: Nov. 14, 2023

(54) ELECTRONIC APPARATUS AND CONTROL METHOD THEREOF

(71) Applicant: SAMSUNG ELECTRONICS CO., LTD., Suwon-si (KR)

(72) Inventors: Woomok Kim, Suwon-si (KR); Hyunmi Choi, Suwon-si (KR); Dongshin Song, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 409 days.

(21) Appl. No.: 16/807,947

(22) Filed: Mar. 3, 2020

(65) Prior Publication Data

US 2020/0285248 A1  Sep. 10, 2020

(30) Foreign Application Priority Data

Mar. 7, 2019  (KR) ........................ 10-2019-0026189

(51) Int. Cl.
*G05D 1/00* (2006.01)
*G05D 1/02* (2020.01)
(Continued)

(52) U.S. Cl.
CPC .......... *G05D 1/0246* (2013.01); *B25J 9/1676* (2013.01); *B25J 19/023* (2013.01);
(Continued)

(58) Field of Classification Search
CPC .. G05D 1/0246; G05D 1/0088; G05D 1/0214; G05D 1/0274; G05D 2201/02; G05D 1/0276; G05D 2201/0206; G05D 2201/0209; B25J 9/1676; B25J 19/023; B25J 19/06; B25J 11/008; B25J 9/1602; B25J 9/1664; B25J 9/1674; B25J 9/1679;
(Continued)

(56) References Cited

U.S. PATENT DOCUMENTS 6,507,773 B2 * 1/2003 Parker .................... G06N 3/008
                                                          700/264
8,355,818 B2 1/2013 Nielsen et al.
(Continued)

FOREIGN PATENT DOCUMENTS

CN  102687174 A * 9/2012 ............. G06T 7/004
CN  108994839 A * 12/2018
(Continued)

OTHER PUBLICATIONS

JP2003117866A.translate.English (Year: 2003).*
(Continued)

Primary Examiner — B M M Hannan
(74) Attorney, Agent, or Firm — Sughrue Mion, PLLC

(57) ABSTRACT

Disclosed is an electronic apparatus. The electronic apparatus includes: a camera; a memory configured to store attribute information and environment information; and a processor configured to identify a plurality of objects based on an image obtained by the camera, identify a first context of a first object, from among the plurality of objects, based on a relationship between attribute information of the plurality of objects and the environment information, and control a traveling state of the electronic apparatus based on the first context.

18 Claims, 20 Drawing Sheets

(51) Int. Cl.
*G06T 7/70* (2017.01)
*B25J 9/16* (2006.01)
*B25J 19/02* (2006.01)
*B25J 19/06* (2006.01)
*G06N 3/08* (2023.01)
*G06V 20/10* (2022.01)

(52) U.S. Cl.
CPC .............. *B25J 19/06* (2013.01); *G05D 1/0088* (2013.01); *G05D 1/0214* (2013.01); *G05D 1/0274* (2013.01); *G06N 3/08* (2013.01); *G06T 7/70* (2017.01); *G06V 20/10* (2022.01); *G05D 2201/02* (2013.01); *G06T 2207/10016* (2013.01); *G06T 2207/20081* (2013.01); *G06T 2207/20084* (2013.01); *G06T 2207/30196* (2013.01)

(58) Field of Classification Search
CPC . B25J 9/1697; G06N 3/08; G06T 7/70; G06T 2207/10016; G06T 2207/20081; G06T 2207/20084; G06T 2207/30196; G06V 20/10; G08B 21/02; G08B 21/0492; G08B 21/0423; G08B 21/043; G06K 9/628
USPC ........................................................ 700/255
See application file for complete search history.

(56) References Cited

U.S. PATENT DOCUMENTS

| | | | |
|---|---|---|---|
| 8,504,202 B2 | 8/2013 | Ichinose et al. | |
| 8,583,282 B2* | 11/2013 | Angle | G05D 1/0246 700/245 |
| 8,611,321 B2* | 12/2013 | Herrala | H04W 4/029 370/338 |
| 9,355,368 B2 | 5/2016 | Djugash | |
| 9,375,847 B2* | 6/2016 | Angle | H04L 12/282 |
| 9,436,185 B2* | 9/2016 | Schnittman | G05D 1/024 |
| 9,595,115 B1* | 3/2017 | Cederlof | G06T 19/006 |
| 9,858,496 B2 | 1/2018 | Sun et al. | |
| 10,282,849 B2* | 5/2019 | Piekniewski | H04N 19/503 |
| 10,478,037 B2* | 11/2019 | Duenne | G05D 1/0274 |
| 10,909,826 B1* | 2/2021 | Solh | G08B 21/0423 |
| 11,019,972 B2 | 6/2021 | Lee et al. | |
| 11,161,236 B2* | 11/2021 | Mallinson | G05D 1/0094 |
| 11,353,848 B1* | 6/2022 | Madden | H04N 7/183 |
| 2005/0273967 A1* | 12/2005 | Taylor | G05D 1/0246 15/319 |
| 2010/0185328 A1 | 7/2010 | Kim et al. | |
| 2010/0217528 A1* | 8/2010 | Sato | G05D 1/0214 701/300 |
| 2010/0222954 A1 | 9/2010 | Ichinose et al. | |
| 2012/0185094 A1* | 7/2012 | Rosenstein | G05D 1/0272 901/1 |
| 2013/0274924 A1* | 10/2013 | Chung | G05D 1/0274 700/259 |
| 2014/0279733 A1 | 9/2014 | Djugash | |
| 2014/0324271 A1* | 10/2014 | Oh | G05D 1/0246 701/28 |
| 2015/0100167 A1* | 4/2015 | Sloo | G08B 25/012 700/278 |
| 2016/0303738 A1* | 10/2016 | Laurent | G06N 3/049 |
| 2017/0060150 A1* | 3/2017 | Stefanski | G01K 7/02 |
| 2017/0102710 A1* | 4/2017 | Hu | A47L 9/30 |
| 2017/0185085 A1 | 6/2017 | Storfer et al. | |
| 2017/0225336 A1 | 8/2017 | Deyle et al. | |
| 2017/0343966 A1* | 11/2017 | Schadow | H04W 4/80 |
| 2018/0039835 A1* | 2/2018 | Rajkumar | G06T 1/0014 |
| 2018/0050634 A1* | 2/2018 | White | G05D 1/0016 |
| 2018/0099412 A1 | 4/2018 | Pinter et al. | |
| 2018/0224862 A1* | 8/2018 | Akazawa | G06V 10/245 |
| 2018/0239355 A1* | 8/2018 | Lee | G08G 1/166 |
| 2018/0317725 A1 | 11/2018 | Lee et al. | |
| 2019/0077007 A1* | 3/2019 | Mallinson | G05D 1/0094 |
| 2019/0179333 A1* | 6/2019 | Noh | G06V 10/25 |
| 2019/0200872 A1* | 7/2019 | Matsuoka | A61B 5/0013 |
| 2019/0246075 A1* | 8/2019 | Khadloya | H04N 7/183 |
| 2019/0320867 A1* | 10/2019 | Noh | B25J 19/06 |
| 2020/0160034 A1* | 5/2020 | Choi | G06K 9/6289 |
| 2022/0331028 A1* | 10/2022 | Sternitzke | A61B 5/1176 |

FOREIGN PATENT DOCUMENTS

| | | | | |
|---|---|---|---|---|
| CN | 109015680 A | * | 12/2018 | .............. B25J 11/00 |
| CN | 111515946 B | * | 7/2021 | ........... B25J 11/0005 |
| EP | 1469423 A1 | | 10/2004 | |
| EP | 3156872 A1 | * | 4/2017 | ........... G05D 1/0246 |
| EP | 2993623 B1 | | 8/2017 | |
| EP | 3584043 A1 | | 12/2019 | |
| JP | 2003-117866 A | | 4/2003 | |
| JP | 2014-176963 A | | 9/2014 | |
| KR | 10-0656372 B1 | | 12/2006 | |
| KR | 10-2008-0073993 A | | 8/2008 | |
| KR | 10-0917377 B1 | | 9/2009 | |
| KR | 10-1013384 B1 | | 2/2011 | |
| KR | 10-1105139 B1 | | 1/2012 | |
| KR | 10-1692688 B1 | | 1/2017 | |
| KR | 10-2017-0048815 A | | 5/2017 | |
| KR | 10-2017-0135195 A | | 12/2017 | |
| KR | 10-2018-0040255 A | | 4/2018 | |
| KR | 10-2018-0096078 A | | 8/2018 | |
| KR | 10-2018-0134155 A | | 12/2018 | |
| KR | 20190027354 A | * | 3/2019 | |
| WO | WO-2019031825 A1 | * | 2/2019 | ........... G05D 1/0221 |

OTHER PUBLICATIONS

KR20170135195.translate.English (Year: 2017).*
KR20180040255.translate.English (Year: 2018).*
KR20180134155.translate.English (Year: 2018).*
Written Opinion (PCT/ISA/237) issued by the International Searching Authority in corresponding International Application No. PCT/KR2020/002810, dated Jun. 12, 2020.
International Search Report (PCT/ISA/210), issued by International Searching Authority in corresponding International Application No. PCT/KR2020/002810, dated Jun. 12, 2020.
Communication dated Aug. 12, 2021 by the European Patent Office in counterpart European Patent Application No. 20160582.1.
Communication dated Sep. 11, 2020, issued by the European Patent Office in counterpart European Application No. 20160582.1.
Torralba, A., et al., "Context-based vision system for place and object recognition", Proceedings Ninth IEEE International Conference on Computer Vision, Oct. 13-16, 2003, XP055535134, pp. 1-8.
Communication dated Nov. 18, 2022 issued by the European Patent Office in counterpart European Patent Application No. 22190448.5.
Communication dated Jun. 20, 2023, issued by the European Patent Office in counterpart European Application No. 22190448.5.

* cited by examiner

FIG. 11
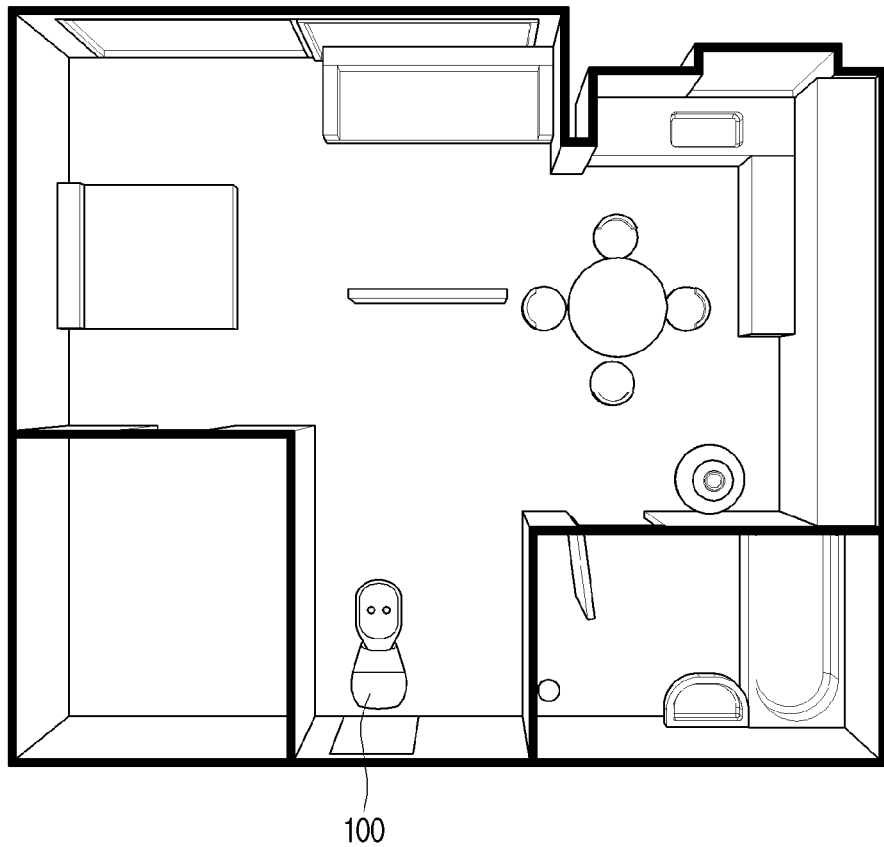
100
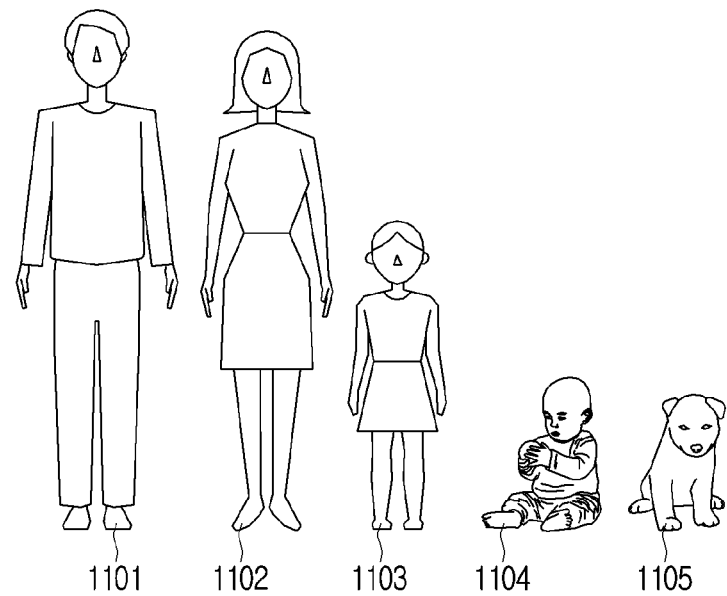
1101    1102    1103    1104    1105

ELECTRONIC APPARATUS AND CONTROL METHOD THEREOF

CROSS-REFERENCE TO RELATED APPLICATION(S)

This application is based on and claims priority under 35 U.S.C. § 119 to Korean Patent Application No. 10-2019-0026189, filed on Mar. 7, 2019, in the Korean Intellectual Property Office, the disclosure of which is incorporated by reference herein in its entirety.

BACKGROUND

Field

The disclosure relates to an electronic apparatus and a control method thereof, and more particularly, to an electronic apparatus capable of autonomously traveling, and a control method thereof.

Description of Related Art

As electronic technology continues to develop, new types of electronic devices, such as a robot, have been developed and spread, particularly for use in various places such as homes, offices, public places, and the like.

However, these devices may not recognize a relationship between objects. If a person is sitting on a chair, the chair may be moved by the person, separately from movement of the person. In this case, it may not be possible to predict movement of the chair and a collision between the chair and an electronic device.

As such, a current situation may not be accurately analyzed or a future situation may not be accurately predicted, because a relationship between a plurality of objects is not considered.

SUMMARY

Embodiments of the disclosure overcome the above disadvantages and other disadvantages not described above. Also, the disclosure is not required to overcome the disadvantages described above, and an embodiment of the disclosure may not overcome any of the problems described above.

One or more embodiments provide an electronic apparatus determining a control operation in consideration of a relationship between attribute information of a plurality of objects, and a control method thereof.

According to embodiments of the disclosure, an electronic apparatus includes: a camera; a memory configured to store attribute information and environment information; and a processor configured to identify a plurality of objects based on an image obtained by the camera, identify a first context of a first object, from among the plurality of objects, based on a relationship between attribute information of the plurality of objects and the environment information, and control a traveling state of the electronic apparatus based on the first context.

The processor may be further configured to identify a first level of danger of the first object based on the first context and control the traveling state of the electronic apparatus based on the first level of danger.

The processor may be further configured to identify a first predicted context of the first object based on the relationship and the environment information, and control the traveling state of the electronic apparatus based on the first predicted context.

One of the plurality of objects may be a static object having a static attribute, another one of the plurality of objects may be a dynamic object having a dynamic attribute, and the processor may be further configured to predict at least one of a moving direction or a moving distance of at least one of the plurality of objects based on a relationship between the static object and the dynamic object and the environment information, and control the traveling state of the electronic apparatus based on the at least one of the predicted moving direction or the predicted moving distance.

The processor may be further configured to identify, based on the dynamic object being identified as within a threshold distance of the static object, a context that the static object is movable by the dynamic object.

The electronic apparatus may be configured to operate in a protection mode, a low-noise mode, a monitoring mode, and a private mode, and the processor may be further configured to identify a current mode of the electronic apparatus, from among the protection mode, the low-noise mode, the monitoring mode, and the private mode, based on the first context.

The processor may be further configured to control the current mode of the electronic apparatus to be at least one from among the private mode or the low-noise mode based on private space information being obtained from the first object, a second object, from among the plurality of objects, being a dynamic object, and a relationship between the plurality of objects and the private space information.

The processor may be further configured to control the current mode of the electronic apparatus to be at least one from among the monitoring mode or the protection made based on a dangerous object, from among the plurality of objects, being identified as having a dangerous attribute and a relationship between the plurality of objects.

Each of the plurality of objects may respectively correspond to a plurality of users, the attribute information may include profile information of each of the plurality of users, and the processor may be further configured to identify a context of the plurality of users based on a relationship between the plurality of users and the environment information, and control the traveling state of the electronic apparatus based on the context.

At least one of the plurality of objects may be a user, an attribute of each of the plurality of objects that is the user may include corresponding profile information of the user, and the processor may be further configured to identify a context of the user based on a relationship between the user and other objects of the plurality of objects, the environment information and a behavior history of the user, and control the traveling state of the electronic apparatus based on the context of the user.

The environment information may include at least one of space information, time information, or position information related to a current space.

The processor may be further configured to identify the first context of the first object based on a relationship between attribute information of each of the plurality of objects and the environment information.

According to embodiments of the disclosure, a control method of an electronic apparatus storing attribute information of an object and environment information is provided. The control method includes: identifying a plurality of objects based on an image; identifying a first context of a first object, from among the plurality of objects, based on a relationship between attribute information of the plurality of objects and the environment information; and controlling a traveling state of the electronic apparatus based on the first context.

The control method may further include identifying a first level of danger of the first object based on the first context, and the controlling the traveling state of the electronic apparatus may be based on the first level of danger.

The identifying the first context may include identifying a first predicted context of the first object based on the relationship and the environment information, and the controlling the traveling state of the electronic apparatus may be based on the first predicted context.

One of the plurality of objects may be a static object having a static attribute, another one of the plurality of objects may be a dynamic object having a dynamic attribute, the control method may further include identifying at least one of a moving direction or a moving distance of at least one of the plurality of objects based on a relationship between the static object and the dynamic object, and the environment information, and the controlling the traveling state of the electronic apparatus may be based on the at least one of the predicted moving direction or the predicted moving distance.

The control method may further include, based on the dynamic object being identified as within a threshold distance of the static object, a context that the static object is movable by the dynamic object is identified.

The controlling of the traveling state of the electronic apparatus may include identifying a current mode of the electronic apparatus is identified based on the first context, and the current mode may be selected from among a protection mode, a low-noise mode, a monitoring mode, or a private mode.

The identifying the first context may include identifying whether private space information is obtained from the first object and a second object, from among the plurality of objects, is a dynamic object, and the controlling the traveling state of the electronic apparatus may include selecting the current mode as one from among the private mode or the low-noise mode based on the first context.

According to embodiments of the disclosure, a non-transitory computer readable medium storing computer instructions that, when executed by a processor of an electronic apparatus storing attribute information of an object and environment information, causes the electronic apparatus to perform operations, the operations including: identifying a plurality of objects based on an image; identifying a first context of a first object, from among the plurality of objects, based on a relationship between attribute information of the plurality of objects and the environment information; and controlling a traveling state of the electronic apparatus based on the first context.

According to embodiments of the disclosure, an electronic apparatus includes: a camera; a motor; and a processor configured to: identify a first path for the electronic apparatus to travel; control the motor to move the electronic apparatus along the first path; control the camera to capture an image; identify a first object and a second object in the image; identify whether the first path conflicts with a first location of the first object or a second location of the second object; identify a second path for the electronic apparatus to travel based on the first path conflicting with at least one among the first location or the second location; and control the motor to move the electronic apparatus along the second path.

The processor may be further configured to: identify a relationship between the first object and the second object based on first attributes of the first object and second attributes of the second object; identify a context between the first object and the second object based on the relationship between the first object and the second object, and environment information; identify a third path for the electronic apparatus to travel based on the context; and control the motor to move the electronic apparatus along the third path.

The processor may be further configured to: identify the first object as a child, the second object as a bed; identify the context based on whether a third object that is identified as a protector is identified; based on the third object not being identified, identify the context as protection needed, control the motor to approach the first object and the second object, and control the electronic apparatus to monitor the child.

The processor may be further configured to identify the first object and the second object by inputting the image into a neural network.

The electronic apparatus may further include a microphone, and the processor may be further configured to identify the relationship between the first object and the second object based on speech corresponding to audio captured by the microphone.

Additional and/or other aspects and advantages of the disclosure will be set forth in part in the description which follows and, in part, will be obvious from the description, or may be learned by practice of the disclosure.

BRIEF DESCRIPTION OF THE DRAWING

The above and/or other aspects, features and advantages of certain embodiments of the disclosure will be more apparent from the following description taken in conjunction with the accompanying drawings, in which:

FIG. 11 is a view for describing an operation in which the electronic apparatus stores information on a member;

DETAILED DESCRIPTION

Figure 1:
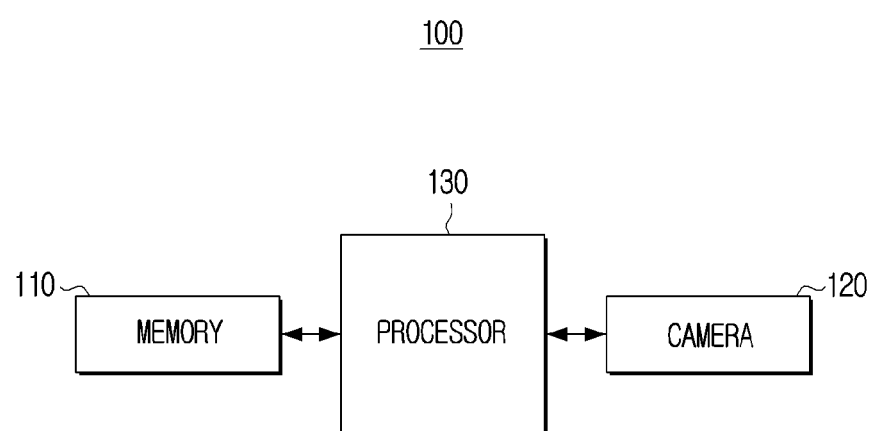
FIG. 1 is a block diagram illustrating an electronic apparatus according to an embodiment.

Terms used in the specification and claims have been selected in consideration of functions in various embodiments. However, these terms may be changed with an intention of an engineer who works in a corresponding field, legal or technical interpretation, the emergence of new technology, and the like. In addition, some terms may be terms arbitrarily selected by an applicant. These terms may be interpreted as having a meaning defined in the specification, and in case that the terms are not specifically defined, the terms may be interpreted based on general contents of the specification and a common technical knowledge in a corresponding technical field.

In addition, throughout the accompanying drawings in the specification, like reference numerals or signs denote parts or components performing substantially the same functions. For convenience of explanation and understanding, the same reference numerals or signs will be used in embodiments different from each other. That is, even when components having the same reference numeral are illustrated in all of a plurality of drawings, it does not mean that the plurality of drawings illustrate the same embodiment.

Further, in the specification and claims, terms including an ordinal number such as "first", "second", or the like may use corresponding components regardless of importance or order and are used to distinguish components from each other without limiting the components. As an example, in case of a component represented by a term combined with the ordinal number, the order of use or disposition of the component should not be limited by the ordinal number. If necessary, ordinal numbers may be replaced with each other.

In the specification, singular forms are intended to include plural forms unless the context clearly indicates otherwise. It is to be further understood that terms "include" or "formed of" used in the specification specify the presence of features, numerals, steps, operations, components, parts, or combinations thereof mentioned in the specification, but do not preclude the presence or addition of one or more other features, numerals, steps, operations, components, parts, or combinations thereof.

Because the disclosure may be variously modified, specific embodiments will be illustrated in the drawings and be described in detail in the detailed description. However, it is to be understood that the disclosure is not limited to specific embodiments, but includes all modifications, equivalents, and substitutions without departing from the scope and spirit of the disclosure.

The expression, "at least one of a, b, and c," should be understood as including only a, only b, only c, both a and b, both a and c, both b and c, or all of a, b, and c In embodiments, a "module", a "unit", or a "-er/-or" refers to a component performing at least one function or operation, and may be implemented by hardware or software or be implemented by a combination of hardware and software. In addition, a plurality of "modules", a plurality of "units", or a plurality of "-ers/-ors" may be integrated in at least one module or chip and be implemented by at least one processor except for a "module", a "unit", or a "-er/-or" that needs to be implemented by specific hardware.

In embodiments, connection between one portion and another portion includes not only direct connection but also indirect connection via a medium. In addition, unless explicitly described otherwise, "comprising" any components will be understood to imply the inclusion of other components but not the exclusion of any other components.

In the disclosure, calculation (recognition) may be performed by a machine-learning-based recognition system, and a deep-learning-based recognition system is described as an example of a classification system using a series of machine-learning algorithms based on neural networks.

The deep-learning-based recognition system may include at least one classifier, and the classifier may correspond to one or a plurality of processors. The processor may be implemented by an array of multiple logical gates, or may be implemented by a combination of a general-purpose microprocessor and a memory storing a program that is executable by the microprocessor.

The classifier may be implemented by a neural network-based classifier, a support vector machine (SVM), an AdaBoost classifier, a Bayesian classifier, a perceptron classifier, or the like. Hereinafter, an embodiment in which the classifier is implemented by a convolutional neural network (CNN)-based classifier will be described. The neural network-based classifier is a computational model implemented to imitate computability of a biological system by using a number of artificial neurons connected by a synapse, and performs a human cognitive function or a learning process through the synapse having a synaptic strength (synaptic weight). However, the classifier is not limited thereto, but may be implemented by various classifiers described above.

A general neural network includes an input layer, a hidden layer, and an output layer, and the hidden layer may be constituted by one or more layers as needed. As an algorithm for training such a neural network, a back propagation algorithm may be used.

The classifier may train the neural network to output, once any data are input to the input layer of the neural network, output data for the input learning data to the output layer of the neural network. Once characteristic information extracted from the input data is input, a pattern of the characteristic information may be classified as any one of multiple classes and a classification result may be output by using the neural network.

The processor is a classification system using a series of machine-learning algorithms based on neural networks, and a deep-learning-based recognition system may be used.

FIG. 1 is a block diagram illustrating an electronic apparatus according to an embodiment.

Referring to FIG. 1, an electronic apparatus 100 may include a memory 110, a camera 120, and a processor 130.

The electronic apparatus 100 may be implemented by an apparatus that automatically processes a given task by using its own ability or operates. For example, the electronic apparatus 100 may be implemented by a robot. As an example, the electronic apparatus 100 may be implemented by a service robot, a traveling robot, a transport robot, a cleaning robot, or a pet robot. Alternatively, for example, the electronic apparatus 100 may be implemented by a home service robot or an industrial robot. The above-described examples are only for describing the electronic apparatus, and the electronic apparatus is not necessarily limited thereto.

The memory 110 may be implemented by an internal memory such as a read-only memory (ROM) (for example, an electrically erasable programmable read only memory (EEPROM)) or a random access memory (RAM) included in the processor 130 or be implemented by a memory separate from the processor 130. In this case, the memory 110 may be implemented in a form of a memory embedded in the electronic apparatus 100 or in a form of a memory attachable to and detachable from the electronic apparatus 100, depending on a data storing purpose. For example, data for driving the electronic apparatus 100 may be stored in the memory embedded in the electronic apparatus 100, and data for an extension function of the electronic apparatus 100 may be stored in the memory attachable to and detachable from the electronic apparatus 100. The memory embedded in the electronic apparatus 100 may be implemented by at least one of a volatile memory (for example, a dynamic RAM (DRAM), a static RAM (SRAM), or a synchronous dynamic RAM (SDRAM)), a non-volatile memory (for example, a one time programmable ROM (OTPROM), a programmable ROM (PROM), an erasable and programmable ROM (EPROM), an EEPROM, a mask ROM, a flash ROM, a flash memory (for example, a NAND flash or a NOR flash), a hard drive, or a solid state drive (SSD), and the memory attachable to and detachable from the electronic apparatus 100 may be implemented by a memory card (for example, a compact flash (CF), a secure digital (SD), a micro secure digital (Micro-SD), a mini secure digital (Mini-SD), an extreme digital (xD), a multi-media card (MMC)), an external memory (for example, a USB memory) connectable to the USB port, or the like.

According to an embodiment, the memory 110 may store attribute information of a plurality of objects and environment information related to a predetermined space.

Here, the attribute information may include various information related to an object. Specifically, the attribute information of the object may include a name, property information, characteristic information, and relationship information of the object.

Here, the property information may indicate a unique property of the object. For example, the property information may be information on whether the object has a static property or a dynamic property. In case that the object is a person, the object may have the dynamic property, and in case that the object is a thing, the object may have the static property. Further, the property information may indicate a chemical property of a material. In case that the object is water, the object may have a liquid property, and in case that the object is smoke, the object may have a gaseous property.

Further, the characteristic information may include various characteristics that become a basis of context analysis. The characteristic information may include information on a structure, a configuration, a function, or the like, of the object. For example, characteristic information of a bed object may include information on a general structure of a bed, information that the bed is constituted by a mattress and a frame, and information that the bed is where a person sleeps or lies down to take a rest. Further, the characteristic information may include an appearance and a silhouette of a specific object. In particular, characteristic information of a person object may include a unique characteristic of each person, such as a face, a voice, or a fingerprint.

The relationship information may indicate information on a relationship of a specific object with another object. The relationship information may include various relationships between the attribute information of the object and attribute information of another object. As an example, the relationship information may include a content indicating a relationship in which a first object uses a second object. For example, in case that the first object is a person and the second object is a bed, the first object and the second object may have a relationship in which the first object uses the second object. As another example, the first object and the second object may be in a dangerous relationship. For example, in case that the first object is a child and the second object is fire, the first object and the second object may be in a dangerous relationship. As another example, the relationship information may indicate a relationship between a static object and a static object, a relationship between a static object and a dynamic object, and a relationship between a dynamic object and a dynamic object.

The environment information may include at least one of time information, space information, or position information related to the predetermined space. Further, the environment information may be changed depending on a change in a time, a space, or a position.

The time information may include time information corresponding to a specific space. Here, the specific space may indicate an entire space in which the electronic apparatus 100 is operated or a sub space in the entire space. The time information corresponding to the specific space may indicate a time for which the specific space is used or a time predetermined by a user for the specific space. For example, a time (from 11 p.m. to 8 a.m.) for which a bedroom is used may be obtained by using usage time information of general users, user behavior history information, time information that is directly set by the user, or the like. The time information may include at least one of a start time, a finish time, or a duration time corresponding to specific information.

Further, the space information may include information related to a use of the specific space. For example, a content that a bathroom is a space for shower and face-washing, a kitchen is a space for dining and cooking, and a bedroom is a space for rest and sleeping may correspond to the space information. Such a space information may be stored as default, or may be obtained from an external device (for example, an external server) based on an attribute of each space. Alternatively, use information set by the user may be included in the space information. For example, in case that the user adds a bedroom as a reading area, the corresponding information may be added to the space information. Further, the space information may include map information about predetermined spaces.

The position information may include relative or absolute position information of a specific position or space. As an example, the position information may include absolute coordinate information of a specific position. For example, the position information may include coordinate information of a specific position where an object to be avoided by the electronic apparatus 100 during traveling is located. As another example, the position information may include relative coordinate information of each sub space included in the entire space. For example, the position information may include position information such as information that a kitchen is located in front of a living room and a main room is located to the right of the living room.

The environment information may be obtained by the electronic apparatus 100 based on the input data. For example, the electronic apparatus 100 may identify that a space where the electronic apparatus 100 is currently located is a bathroom based on space information stored in the memory 110.

According to another example, the environment information may be obtained based on an identified object. For example, in case that a shower object is identified, the electronic apparatus 100 may identify that a space where the electronic apparatus 100 is currently located is a bathroom.

Although some embodiments of the attribute information of the object and the environment information have been described, the attribute information of the object and the environment information are not necessarily limited thereto, and may include various information in addition to the above-described content.

The camera 120 may be implemented by a front camera provided on a front surface of the electronic apparatus 100, and may capture an image of an object in front of the electronic apparatus 100 to obtain a captured image. The camera 120 may capture an image of a subject in front of the camera 120, for example, a face of the user, to obtain a user face image. Once the image of the subject is captured by the camera 120, the image of the subject is converted into an electric image signal through a charge coupled device (CCD) and the image signal obtained by the conversion is amplified and converted into a digital signal. The digital signal obtained by the conversion as described above may be subjected to digital signal processing to be converted into a captured image.

The processor 130 controls a general operation of the electronic apparatus 100. The processor 130 may be implemented by a digital signal processor (DSP) processing a digital signal, a microprocessor, or a time controller (TCON). However, the disclosure is not limited thereto, and the processor 130 may include one or more of a central processing unit (CPU), a micro controller unit (MCU), a micro processing unit (MPU), a controller, an application processor (AP), a graphics-processing unit (GPU), a communication processor (CP), or an ARM processor, or may be defined by these terms. In addition, the processor 130 may be implemented by a system-on-chip (SoC) or a large scale integration (LSI) in which a processing algorithm is embedded, or may be implemented in a field programmable gate array (FPGA) form. The processor 130 may perform various functions by executing computer executable instructions stored in the memory 110.

According to an embodiment, the processor 130 may identify (or determine) a plurality of objects based on the image obtained by the camera 120, identify a context of at least one of the plurality of objects based on a relationship between attribute information of the plurality of respective identified objects, and the environment information, and control a traveling state (or operation state or operation mode) of the electronic apparatus based on the identified context. However, it is also possible to receive an image captured by a camera provided in an external device.

According to another embodiment, the processor 130 may identify a plurality of objects based on an audio signal obtained through a microphone 170 of the electronic apparatus 100 or a microphone of the external device. In addition, the processor 130 may identify a plurality of objects based on various types of input data. Here, the input data may be obtained by using a method in which the electronic apparatus 100 directly obtains (or performs pre-scanning) the input data, a method in which the input data are directly input by the user, or a method in which the input data are received from an external server (for example, a cloud server). Here, the electronic apparatus 100 may use various sensors such as an image sensor, a sound sensor, an acceleration sensor, a gyro sensor, an ultrasonic sensor, an infrared sensor, and a radio frequency sensor to directly obtain the input data.

Further, the processor 130 may provide various data described above, for example, a captured image to an artificial intelligence learning model and receive information on an identified object from the artificial intelligence learning model. The processor 130 may individually identify a plurality of objects at the same point in time. For example, the processor 130 may simultaneously identify a person object and a bed object currently located in front of the electronic apparatus based on the captured image.

The relationship (or a relationship between objects) between attribute information of the plurality of respective objects may indicate a state or an operation that may be caused between the plurality of objects by a characteristic or property of each of the plurality of objects. For example, the relationship between attribute information of the plurality of respective objects may include a use relationship, a dangerous relationship, a protection relationship, a movement relationship, and the like. As an example, a person object and a bed object may be in a relationship in which the person uses the bed. As another example, a fire object and a child object may be in the dangerous relationship. As another example, an adult object and a child object may be in the protection relationship. As another example, a chair object and a person object may be in the movement relationship. Here, the movement relationship may indicate a relationship in which the first object (person) may move the second object (chair). Here, the use relationship is a comprehensive concept described for convenience of explanation, and there may be various specific relationships. In describing various embodiments, a relationship between attribute information of the first object and attribute information of the second object may be described as a relationship between the first object and the second object.

Further, the processor 130 may determine a relationship between objects based on a presence or absence of an object. The processor 130 may determine the relationship to be different depending on a presence or absence of a specific object. For example, in case that a child object is identified, but an adult object is not identified, the processor 130 may determine that there is no protector, identify a context that the child object needs protection by additionally considering the environment information, and perform an appropriate control operation.

According to an embodiment, the processor 130 may identify various contexts based on the relationship (or relationship between objects) between attribute information of the plurality of objects and the environment information.

The context may be a concept including a situation, a state, a background, a thread, and the like. Further, the context may include at least one of a past context corresponding to a past situation, a present context corresponding to a current situation, or a predicted context corresponding to a possible situation. A specific embodiment of the present context will be described later with reference to FIG. 5 and a specific example of the predicted context will be described later with reference to FIG. 6.

According to an embodiment, the processor 130 may identify a context based on the relationship between a plurality of objects, and the environment information. For example, it is assumed that information on a sleeping time from 11 p.m. to 8 a.m. is stored as the environment information. In case that the electronic apparatus 100 determines that the current time is 6 a.m., the electronic apparatus 100 may identify a current context that "a person is sleeping on a bed" in consideration of the relationship (use relationship) between the person object and the bed object and the environment information (sleeping time).

According to another embodiment, the processor 130 may identify a context based on a relationship between attribute information of a single object and the environment information. For example, it is assumed that information on a sleeping time (from 11 p.m. to 8 a.m.) corresponding to a specific object (for example, an adult object) is stored as the environment information. In this case, the processor 130 may identify a context in consideration of the sleeping time (from 11 p.m. to 8 a.m.) stored for an adult object. However, for a child object, the processor 130 may identify a context without considering the stored sleeping time.

According to another embodiment, the processor 130 may identify a context by using at least one of attribution information of an object, a relationship between a plurality of objects, environment information, or a relationship between attribution information of a specific object and environment information. For example, the processor 130 may identify a context by considering a relationship between a plurality of objects. In case that a context is not identified, the processor 130 may additional consider environment information, and in case that a context is not identified even by considering the environment information, the processor 130 may identify a context by additionally considering a relationship between attribute information of a specific object and environment information. That is, the processor 130 may identify a context by sequentially considering various information, thereby improving accuracy of context recognition.

The processor 130 may perform a control operation corresponding to the identified context. Specifically, the processor 130 may control the traveling state of the electronic apparatus 100 based on the identified context or perform a control to cause the electronic apparatus 100 to perform a specific function. As an example, the processor 130 may perform an operation of setting a basic traveling route of the electronic apparatus 100 and moving along the basic traveling route, an operation of partially changing the basic traveling route and moving along a new traveling route, an operation of stopping on the basic traveling route, an operation of partially changing the basic traveling route and observing (or monitoring) a specific object at a specific position, an operation of stopping on the basic traveling route and outputting an alarm sound (or a warning sound), and the like. The above-described operations are illustrative and the disclosure is not necessarily limited thereto. For example, the processor 130 may identify a context that a person watches a television (TV) based on a person object and a TV object, and change a basic traveling route in case that the basic traveling route is set in a space between the TV object and the person object in order not to interrupt the TV watching of the person.

The processor 130 may identify a level of danger (or a degree of danger) corresponding to the identified context based on the identified context and control the traveling state of the electronic apparatus 100 based on the identified level of danger.

Here, the level of danger (or the degree of danger) may indicate how dangerous the identified context is. For example, the level of danger may be classified into 0 to 100 depending on a user setting, and a larger number may indicate a more dangerous situation. Here, the level of danger of 0 may indicate a situation in which there is nothing that needs attention of the electronic apparatus 100. The level of danger may be determined based on at least one of each object, a relationship between a plurality of objects, or absolute environment information. Here, the relationship between the plurality of objects may indicate a relationship of the first object (specific object) with the second object (another object different from the specific object) or may indicate a generation relationship between the first object and the second object. For example, the level of danger may indicate how dangerous a dynamic object (person) is, which is determined based on a relative context of the dynamic object with respect to a static object (thing).

The processor 130 may predict a possible context of at least one of a plurality of objects based on the relationship between the plurality of objects, and the environment information, and control the traveling state of the electronic apparatus based on the predicted context.

Here, the possible context may indicate various situations that may occur in the future based on a current context. The processor 130 may predict various situations that may occur in the future, rather than a current situation, based on the relationship between the plurality of objects, and the environment information. The predicted context may be obtained by analyzing the current context and selecting a context that is likely to occur in the future. As an example, in case that a person is lying on a bed, the predicted context may be a situation in which the person gets out from the bed. As another example, in case that a person is sitting on a chair, the predicted context may be a situation in which the person may move the chair back to get out of the chair.

The processor 130 identifies the predicted context in addition to the current context, and thus the electronic apparatus 100 may perform control operations corresponding to various contexts. As a result, the electronic apparatus 100 may provide an appropriate service or control operation to the user. In particular, the electronic apparatus 100 may consider a dangerous situation or important situation in advance to be able to prepare for the predicted situation.

One of the plurality of objects may be a static object having a static attribute and the other one of the plurality of objects may be a dynamic object having a dynamic attribute. Here, the processor 130 may predict at least one of a moving direction or a moving distance of at least one of the plurality of objects based on a relationship between the static object and the dynamic object, and the environment information, and control the traveling state of the electronic apparatus based on at least one of the predicted moving direction or the predicted moving distance.

The static object may indicate an object that does not move by itself. For example, the static object may be an object such as a bed, a sofa, a chair, a ceramic, or a shower. The dynamic object may indicate an object that moves by itself. For example, the dynamic object may be an object such as a person, an adult, a child, or a pet.

Here, it is assumed that the processor 130 identifies both of the static object and the dynamic object. In this case, the processor 130 may identify a context in consideration of the relationship between the static object and the dynamic object. As an example, the static object may be in a relationship in which the static object may be moved by the dynamic object. For example, the chair object may be in a relationship in which the chair object may be moved by the person object in a specific direction. However, not all the static objects may be in a relationship in which the static object may be moved by the dynamic object. For example, a refrigerator object is generally not moved after installation. Therefore, although the refrigerator object is a static object, the refrigerator object may not be in a relationship in which the refrigerator object is moved by the dynamic object. Further, the chair object may be in a relationship in which the chair object may be moved by the adult object, but the chair object may not be in a relationship in which the chair object is moved by the child object (for example, an infant). The static object may be in a relationship in which the static object may be moved, depending on attribute information thereof or a relationship with another object.

The electronic apparatus 100 may predict at least one of a moving direction, a moving distance, or a moving speed of a specific object. Here, the specific object may be the static object or the dynamic object. The moving direction, the moving distance, or the moving speed of the object may be determined based on attribute information of the object. As an example, the case that a person is sitting on a chair is assumed. The processor 130 may identify that the chair object is in a relationship in which the chair object may be moved by a person, and may predict a direction in which the chair object may be moved by the person, a moving distance, and the like. For example, in case that a person is sitting on a chair, the processor 130 may identify that the person may push back the chair and may move the chair by about 0.5 m to 1 m. Here, the moving direction and the moving distance may each have a predetermined value corresponding to the object. According to another example, the moving direction and the moving distance may be obtained by analyzing a behavior of the identified person object.

The processor 130 may control the traveling state of the electronic apparatus 100 based on at least one of the predicted moving direction or the predicted moving distance of the specific object. The processor 130 may change the existing moving route based on at least one of the predicted moving direction or the predicted moving distance of the specific object.

If it is determined that the plurality of objects are in contact with each other, the processor 130 may identify a context in consideration of the relationship between attribute information of the plurality of objects. As an example, in case that the static object and the dynamic object are in contact with each other, the processor 130 may identify a context in consideration of a relationship between the static object and the dynamic object.

Specifically, in case that it is identified that the dynamic object is in at least one of a contiguous contact state to the static object or a contact state with the static object, the processor 130 may identify a context that the static object may be moved by the dynamic object.

The contiguous contact state or the contact state may indicate that the first object and the second object are physically in contact with each other. For example, the person object and the chair object may be in the contiguous contact state in a situation in which the person object is sitting on the chair object.

According to another example, in case that it is identified that the first object and the second object are located within a predetermined range, the processor 130 may determine that the first object and the second object are in the contiguous contact state.

In case that it is identified that the static object and the dynamic object are in a relationship in which the static object may be moved by the dynamic object and it is identified that the dynamic object and the static object are in the contiguous contact state or the contact state, the processor 130 may identify a predicted context that the static object may be moved by the dynamic object. Here, the predicted context may include information on a predicted moving direction or the predicted moving distance of the static object.

Further, the processor 130 may identify a mode of the electronic apparatus based on the identified context, and the mode of the electronic apparatus may include at least one of a protection mode, a low-noise mode, a monitoring mode, or a private mode.

The processor 130 may identify a traveling state of the electronic apparatus 100 that corresponds to the identified context and identify a mode (or a traveling mode) in which the electronic apparatus 100 may be controlled according to the identified traveling state. The low-noise mode may be a mode in which an operation of lowering performance of an engine or reducing revolutions per minute (RPM) of the motor is performed to reduce noise generated by the electronic apparatus 100. Particularly, in the low-noise mode, a speed of the electronic apparatus 100 may be reduced and a moving angle of the electronic apparatus 100 may be changed.

According to another example, in case that the electronic apparatus 100 includes a display, the electronic apparatus 100 may include a low-brightness mode. In case that the processor 130 identifies a context that the person object is sleeping, an operation of reducing noise of the electronic apparatus 100 may be performed together with an operation of lowering a brightness of a screen of the display of the electronic apparatus 100.

The monitoring mode may be a mode in which an operation of observing a specific object is performed. The electronic apparatus 100 may stop on the basic traveling route or change the basic traveling route to observe the specific object. The monitoring mode may be determined based on a context of the specific object.

The protection mode may be a mode for protecting a specific object. According to an example, for protection of the specific object, the electronic apparatus 100 may change the basic traveling route to keep away from the object by a predetermined distance. The protection mode may correspond to a mode for preventing a collision between the electronic apparatus 100 and the specific object. For example, in case that a person sitting on a chair is identified, in the protection mode, the electronic apparatus 100 may identify a possibility of collision with the chair as the predicted context, and change the basic traveling route to keep away from the chair. According to another example, the electronic apparatus 100 may approach the specific object to protect the specific object. Here, the protection mode may be a mode in which an operation for assisting in protection of the specific object is performed. In the protection mode, the electronic apparatus 100 may approach or keep away from the specific object depending on the context.

The private mode may be a mode in which collection of data about a specific space is stopped. In the private mode, the processor 130 may stop an image capturing operation of the camera 120 in the specific space. For example, in case that a person is taking a shower in a bathroom, the processor 130 may stop image capturing by the camera 120, in the private mode. Further, the processor 130 may store a distance and a direction in which an image of the specific space may be captured in the private mode in the memory 110 in advance, and the processor 130 may control the camera 120 of the electronic apparatus 100 to prohibit image capturing of the specific space. According to another example, the processor 130 may control the microphone 170 to stop receiving audio data in the private mode.

Further, in the private mode, the processor 130 may perform a control to cause the electronic apparatus 100 to switch to a standby mode while keeping a certain distance from a private space.

In the private mode, the processor 130 may request the user for a separate confirmation to perform the above-described control operation. As an example, the processor 130 may not automatically capture an image of the specific space and may request the user for confirmation to perform image capturing. As another example, the processor 130 may request the user for confirmation to stop capturing an image of the specific space.

Further, in case that private space information is obtained from one of the plurality of objects and the other one of the plurality of objects is the dynamic object, the processor 130 may identify a context of the dynamic object based on a relationship between the plurality of objects, and the private space information, and may perform a control to cause the electronic apparatus to be in at least one of the private mode or the low-noise mode based on the identified context.

The environment information may include space information, and the space information may include the private space information. The private space may indicate a space that is not open. The processor 130 may set a space that is not open, such as a bathroom or a bedroom, as the private space and store information on the private space in the memory 110. In addition, the processor 130 may obtain the private space information which is the environment information based on the recognized object. The processor 130 may identify a private context based on the relationship between the plurality of objects, and the private space information, and may perform a control to cause the electronic apparatus 100 to travel in the private mode according to the private context.

For example, in case that the electronic apparatus 100 identifies the shower object, the electronic apparatus 100 may identify bathroom space information (private space information) based on the shower object. Here, in case that the electronic apparatus 100 identifies the shower object and the person object, the electronic apparatus 100 may identify that the shower object and the person object are in the use relationship or usable relationship. Further, the processor 130 may identify a context that a person takes a shower by using a shower based on the relationship between the shower object and the person object, and the private space information, and the processor 130 may determine that the context corresponds to the private context. Further, the processor 130 may control the traveling state of the electronic apparatus 100 according to the private context. Specifically, the processor 130 may perform a control to cause the electronic apparatus 100 to travel in the private mode.

Further, in case that a context that one of the plurality of objects is dangerous for the other one of the plurality of objects is identified based on the relationship between the plurality of objects, the processor 130 may perform a control to cause the electronic apparatus to be in at least one of the monitoring mode or the protection mode.

According to an embodiment, in case that the predetermined first and second objects are recognized at the same time, the processor 130 may determine that the relationship between the first object and the second object is the dangerous relationship. In case that it is identified that the relationship between the plurality of objects is the dangerous relationship, the processor 130 may identify whether or not a context of one of the plurality of objects (or current context) is a dangerous context based on the relationship between the plurality of objects. The context of one of the plurality of objects may not be the dangerous context even in case that the relationship between the plurality of objects is the dangerous relationship. For example, a child object and a sofa object may be in the dangerous relationship. In case that a child is sitting on a sofa, the processor 130 may identify that a relationship between the child and the sofa is the dangerous relationship and a context of the child object is the dangerous context. The processor 130 may identify a situation in which the child may fall off the sofa as the dangerous context. However, even in case that the child and the sofa are recognized (or identified) at the same time, the context of the child object may not be the dangerous context. For example, in case that the child is sitting beside the sofa, although the relationship between the sofa and the child is the dangerous relationship, the context of the child object may not be the dangerous context.

Each of the plurality of objects may be a predetermined user (or member), and an attribute of each of the plurality of objects may include profile information of the predetermined user (or member). Here, the processor 130 may identify a context of the predetermined user (or member) based on the relationship between predetermined users (or members), and the environment information, and control the traveling state of the electronic apparatus based on the identified context.

The processor 130 may store profile information of a member in a predetermined space (for example, a house) in the memory 110. The profile information may include unique characteristic information of each member, such as a name, an age, a sex, a height, a face, a fingerprint, an appearance, a voice, or the like, of each member. The processor 130 may identify whether or not a member is present in the predetermined space and which position the member is located in the predetermined space, based on the profile information. In addition, the processor 130 may identify a context based on a relationship between identified member objects in the predetermined space and the environment information. Here, the relationship between members does not only indicate a relationship between a plurality of members present in the predetermined space. A presence or absence of a member in the predetermined space may correspond to one object. For example, in case that the first object is not present in the predetermined space and the second object is present in the predetermined space, the processor 130 may identify a context based on a relationship between the first object and the second object.

Further, the processor 130 may identify a context based on a combination of a presence or absence of the members. For example, the processor 130 may identify a context based on a fact that first to third members are present in the predetermined space and fourth and fifth members are not present in the predetermined space.

The relationship between the member objects may include various relationships depending on members. As an example, a relationship of the first member with the second member may be a relationship in which the first member protects the second member. On the contrary, a relationship of the second member with the first member may be a relationship in which the second member is protected by the first member. For example, in case that the first member is not present in the predetermined space and only the second member is present in the predetermined space, the processor 130 may identify a context that the second member needs to be protected. Further, the processor 130 may control the traveling state of the electronic apparatus 100 to protect the second member.

Further, at least one of the plurality of objects may be the predetermined user (or member), and an attribute of each of the plurality of objects may include the profile information of the predetermined user (or member). Here, the processor 130 may identify a context of the predetermined user (or member) based on a relationship between the predetermined user (or member) and the other one of the plurality of objects, the environment information, and a behavior history of the predetermined user (or member), and control the traveling state of the electronic apparatus based on the identified context.

The behavior history may indicate a past behavior pattern of the user (or member). For example, the behavior history may indicate a past behavior of a specific member, such as a moving route, TV watching, sleeping, reading, and cooking. The processor 130 may identify whether or not the specific member has a repeating behavior pattern by analyzing the behavior history of the specific member, and may identify a context based on the repeating pattern. As an example, it is assumed that the first member has a behavior pattern in which the first member watches a TV on a sofa every 8 a.m. The processor 130 may analyze the behavior history of the first member and perform a control to prevent the electronic apparatus 100 from traveling in a space between the sofa and the TV at 8 a.m. in order not to interrupt the TV watching of the first member. As another example, in case that a situation in which a child sits on a chair and sways back and forth is repeated, the processor 130 may identify that the child is in a dangerous context based on the behavior history. As another example, in case that a child moves his/her arm to have a meal, puts down silverware, and then stops moving his/her arm, the processor 130 may identify that the child is out of the dangerous context based on the behavior history.

Here, as an example, the relationship between the predetermined user (or member) and the other one of the plurality of objects may indicate the relationship between members or a relationship between a specific member and a separate object. A specific embodiment in which the profile information of a member is used will be described later with reference to FIGS. 11 to 15.

Further, the processor 130 may determine a degree of danger of the identified context based on the identified context and control the traveling state of the electronic apparatus to be different based on the degree of danger.

The processor 130 may identify a plurality of contexts. As an example, the processor 130 may identify the current context and the predicted context based on an input image captured by the camera. Further, the processor 130 may determine a degree of danger of at least one obtained context. The processor 130 may consider a possibility of occurrence of the current context, the number of times of collision, an occurrence frequency, and an expected degree of damage at the time of occurrence to identify the degree of danger. Further, a content of each item may be divided into a plurality of sections and stored in the memory 110, and the processor 130 may apply stored data of each item differently for each context.

Further, according to an embodiment, the processor 130 may control the traveling state of the electronic apparatus 100 based on a degree of danger of each context. For example, in case that a degree of danger of the current context is 60 and a degree of danger of the predicted context is 90, the processor 130 may perform a first control operation corresponding to the current context (the degree of danger: 60), and a second control operation corresponding to the predicted context (the degree of danger: 90). Here, an order in which a plurality of control operations corresponding to the plurality of contexts are performed may be determined by using a predetermined method. For example, the predetermined method may include a method in which the current context is prioritized, a method in which a context with a higher degree of danger is prioritized, a method in which a control operation with a shorter performance time is prioritized, a method in which a control operation for a specific user is prioritized, and the like.

According to another embodiment, the processor 130 may determine a context with the highest degree of danger by comparing degrees of danger corresponding to the plurality of contexts and perform a control operation corresponding to the context with the highest degree of danger. The processor 130 may obtain a degree of safety (level of safety), a level of necessity of protection, and a level of necessity of observation of each context in addition to the degree of danger (level of danger).

Further, the processor 130 may identify a context of at least one of the plurality of objects based on a relationship between attribute information of each of the plurality of identified objects and the environment information.

As an example, the relationship may be a relationship between objects. As another example, the relationship may be a relationship between an object and the environment information. The processor 130 may identify a context by using at least one of the relationship between objects, the relationship between an object and the environment information, and the environment information. For example, the relationship between objects may indicate a relationship between a person and a bed. Further, the relationship between an object and the environment information may indicate a relationship between a person and a sleeping time (from 11 p.m. to 8 a.m.). Here, the sleeping time may be different for each person object.

According to another embodiment, the electronic apparatus 100 may identify a context only based on the relationship between the plurality of objects without the environment information. In case that the electronic apparatus 100 may not identify a context based on the relationship between the plurality of objects or the environment information exits, the electronic apparatus 100 may identify a context in consideration of both of the relationship between the plurality of objects and the environment information.

The processor 130 may identify at least two or more objects and may identify a context in consideration of a relationship between attribute information of the plurality of objects. Although the case that two objects are identified has been described in the disclosure, the electronic apparatus 100 may identify a context in consideration of a relationship between three or more objects.

The electronic apparatus 100 according to the disclosure may identify a context in consideration of the relationship between objects, and thus the electronic apparatus 100 may recognize a context with high accuracy, and perform appropriate control operations corresponding to various situations. Further, the electronic apparatus 100 may control a specific operation in consideration of the environment information. Even in case that the same object is identified, the context may be changed depending on another object or the environment information, and thus a recognition ability of the electronic apparatus 100 for identifying a context may be improved.

Further, according to another embodiment, the electronic apparatus 100 divides the context into the current context and the predicted context, and thus the electronic apparatus 100 may prepare for various situations that may occur, in addition to the current situation. The electronic apparatus 100 may rapidly cope with various situations to improve service satisfaction of the user.

Further, according to another embodiment, the electronic apparatus 100 may identify a context by using the profile information of a member, and thus the electronic apparatus 100 may provide a personal service suitable for the predetermined member (or user) using the predetermined space. Specifically, the electronic apparatus 100 may identify a context in consideration of the relationship between members, and thus may provide a service suitable for a relationship between specific members.

Figure 2:
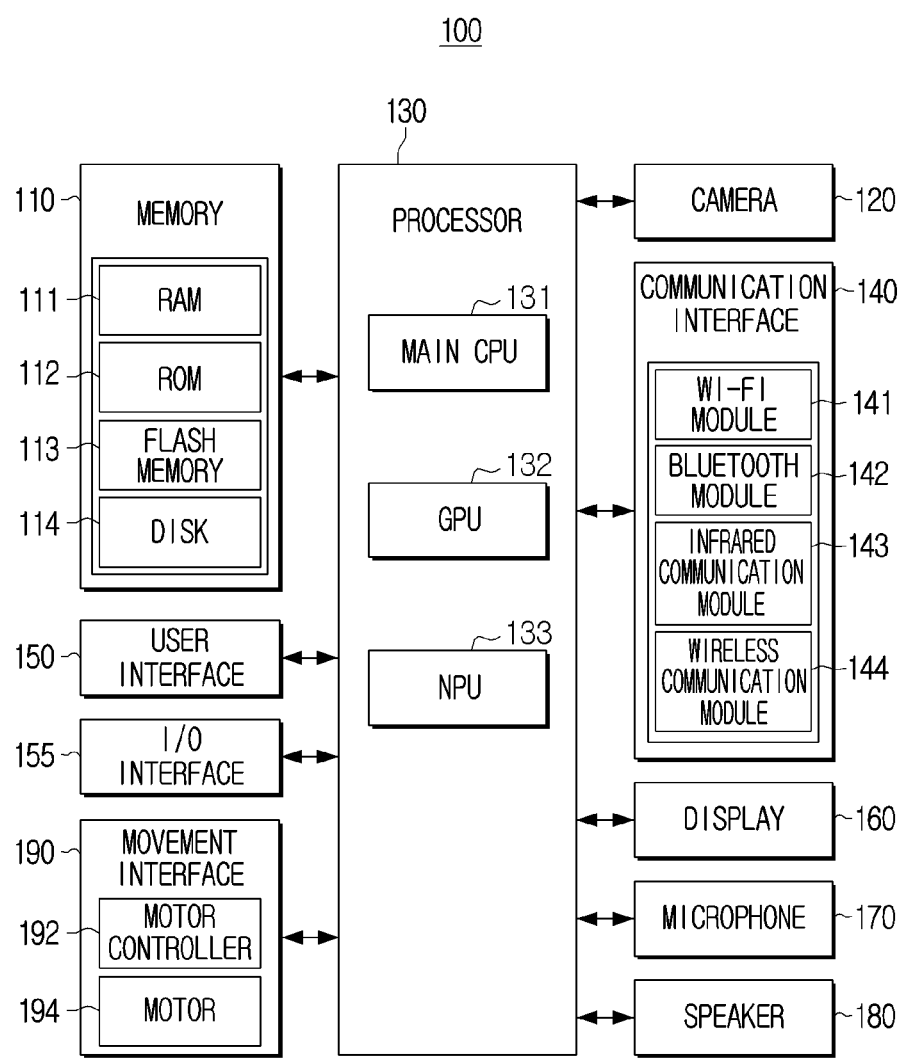
FIG. 2 is a block diagram for describing a specific configuration of the electronic apparatus of FIG. 1.

FIG. 2 is a block diagram for describing a specific configuration of the electronic apparatus of FIG. 1.

Referring to FIG. 2, the electronic apparatus 100 according to an embodiment may include the memory 110, the camera 120, the processor 130, a communication interface 140, a user interface 150, an input and output (I/O) interface 155, a display 160, and the microphone 170.

An overlapping description of the same portions of operations of the memory 110, the camera 120, and the processor 130 as those described above will be omitted.

The memory 110 may indicate a storage device implemented by a random access memory (RAM) 111, a read only memory (ROM) 112, a flash memory 113, and a disk 114. The memory 110 may indicate a memory device or a storage device temporarily or permanently storing data. The memory 110 may store various software such as an operating system (O/S) of the electronic apparatus 100 or an application.

The RAM 11 may indicate a device that is readable and writable by accessing any region. The RAM 111 may be implemented by any one of a dynamic RAM (DRAM), a static RAM (SRAM), a synchronous dynamic RAM (SDRAM), and a ferroelectric random access memory (FeRAM).

The ROM 112 may be a non-volatile memory device in which data remain even in case that power supply is shut down. The ROM 112 may be implemented by a one-time programmable ROM (OTPROM), a programmable ROM (PROM), an erasable and programmable ROM (EPROM), an electrically erasable and programmable ROM (EEPROM), a mask ROM, a flash ROM, or a flash memory.

The flash memory 113 may be a non-volatile memory device from which data may be electrically erased and to which data may be electrically rewritten. The flash memory 113 may be implemented by a NAND flash or a NOR flash depending on an internal method.

The disk 114 may be implemented by a magnetic disk or an optical disk. The magnetic disk may be a memory device using a magnetic field, and may be implemented by a floppy disk or a hard disk drive (HDD). Further, the optical disk may be a memory device using reflection of light, and may be implemented in a form of an optical disk drive.

The memory 110 may include additional storage that may be implemented in various other schemes. For example, the memory 110 may include a storage implemented in a form of a solid-state device or a solid state disk (SDD).

The memory embedded in the electronic apparatus 100 may be implemented by at least one of a volatile memory (for example, the RAM 111), a non-volatile memory (for example, the ROM 112 and the flash memory 113), or the hard disk drive (HDD) or the solid state drive (SDD). The memory attachable to and detachable from the electronic apparatus 100 may be implemented by a memory card (for example, a compact flash (CF), a secure digital (SD), a micro secure digital (Micro-SD), a mini secure digital (Mini-SD), an extreme digital (xD), or a multi-media card (MMC)), an external memory (for example, a universal serial bus (USB) memory) connectable to a USB port, or the like.

The implementation example of the memory 110 has been described above, but the memory 110 is not necessarily limited thereto.

The communication interface 140 is a transceiver (transmitter and receiver) performing communication with various types of external devices in various types of communication manners. The communication interface 140 includes a Wi-Fi module 141, a Bluetooth module 142, an infrared communication module 143, a wireless communication module 144, and the like. The processor 130 may perform communication with various external devices using the communication interface 140. Here, the external device may include an electronic device such as a TV, an image processing device such as a set-top box, an external server, a control device such as a remote controller, a sound output device such as a Bluetooth speaker, a lighting device, a home appliance such as a smart cleaner or a smart refrigerator, a server such as an Internet-of-Things (IoT) home manager, and the like. Further, the communication interface 140 may include a circuitry for performing the above-described operation.

The Wi-Fi module 141 and the Bluetooth module 142 perform communication in a Wi-Fi manner and a Bluetooth manner, respectively. In case of using the Wi-Fi module 141 or the Bluetooth module 142, various connection information such as a service set identifier (SSID) and a session key are first transmitted and received, communication connection is established using the connection information, and various information may then be transmitted and received.

The infrared communication module 143 performs communication by using an infrared data association (IrDA) technology using infrared light which lies between visible light and millimeter waves for short-distance wireless data transmission.

The wireless communication module 144 may indicate a module performing communication according to various communication protocols such as ZigBee, 3rd generation (3G), 3rd generation partnership project (3GPP), long term evolution (LTE), LTE Advanced (LTE-A), 4th generation (4G), and 5th generation (5G), other than the Wi-Fi module 141 and the Bluetooth module 142 described above.

In addition, the communication interface 140 may include at least one of a local area network (LAN) module, an Ethernet module, or a wired communication module performing communication by using a pair cable, a coaxial cable, an optical fiber cable, or the like.

According to an example, the communication interface 140 may use a communication module (for example, the Wi-Fi module) to perform communication with the external device (remote controller) and the external server. The communication interface 140 may use the Wi-Fi module to perform communication with the external device (remote controller) and may use the Wi-Fi module to perform communication with the external server.

According to another example, the communication interface 140 may use different communication modules to perform communication with the external device (remote controller) and the external server. For example, the communication interface 140 may use at least one of the Ethernet module or the Wi-Fi module to perform communication with the external server, and may use the Bluetooth (BT) module to perform communication with the external device such as a remote controller. However, this is only an example, and the communication interface 140 may use at least one of various communication modules in case of performing communication with a plurality of external devices or external servers.

The communication interface 140 may additionally include a tuner and a demodulator according to an implementation example.

The tuner may tune a channel selected by a user or all channels stored in advance to receive a radio frequency (RF) broadcasting signal through an antenna.

The demodulator may receive and demodulate a digital intermediate frequency (IF) (DIF) signal converted in the tuner, and may perform channel decoding or the like.

The processor 130 generally controls an operation of the electronic apparatus 100 using various programs stored in the memory 110. The processor 130 according to an embodiment may be implemented by at least one of a main CPU 131, a graphics processing unit (GPU) 132, or a neural processing unit (NPU) 133. Further, at least one of the main CPU 131, the GPU 132, or the NPU 133 may be connected to the RAM 111, the ROM 112, or the like corresponding to the memory 110 through a bus.

The main CPU 131 may control the O/S of the electronic apparatus 100 by using a command set or the like for system booting stored in the ROM 112. Specifically, once a turn-on command is input to supply power to the main CPU 131, the main CPU 131 copies the O/S stored in the memory 110 to the RAM 111 according to an instruction stored in the ROM 122, and execute the O/S to boot the system. Once the booting is completed, the main CPU 131 may copy various application programs stored in the memory 110 to the RAM 111, and execute the application programs copied to the RAM 111 to perform various operations.

The main CPU 131 accesses the memory 110 to perform booting using the O/S stored in the memory 110. In addition, the main CPU 131 may perform various operations using various programs, contents data, and the like, stored in the memory 110.

The GPU 132 may correspond to a high-performance processing device for graphic processing, and may be a specialized electronic circuit designed to rapidly process and change the memory and accelerate generation of an image in a frame buffer to be output on a screen. Further, the GPU 132 may indicate a visual processing unit (VPU).

The NPU 133 may correspond to an artificial (AI) chipset (or AI processor), and may be an AI accelerator. The NPU 133 may correspond to a processor chip optimized to perform a deep neural network. The NPU 133 may correspond to a processing device performing a deep learning model instead of the GPU 132, and the NPU 133 may also correspond to a processing device performing the deep learning model together with the GPU 132.

Although all of the main CPU 131, the GPU 132, and the NPU 133 are illustrated in FIG. 2, the processor 130 may be implemented by at least one of the main CPU 131, the GPU 132, or the NPU 133.

The processor 130 may perform a graphic processing function (video processing function). For example, the processor 130 may render a screen including various objects such as an icon, an image, and a text by using a calculator and a renderer. Here, the calculator may calculate attribute values such as coordinate values at which the respective objects will be displayed, forms, sizes, and colors of the respective objects depending on a layout of the screen based on a received control command. Further, the renderer may render screens of various layouts including objects based on the attribute values calculated in the calculator. Further, the processor 130 may perform various kinds of image processing such as decoding, scaling, noise filtering, frame rate conversion, and resolution conversion with respect to the video data.

The processor 130 may perform processing with respect to audio data. Specifically, the processor 130 may perform various kinds of processing such as decoding, amplifying, and noise filtering with respect to the audio data.

The user interface 150 may be implemented by a device such as a button, a touch pad, a mouse, or a keyboard, or may be implemented by a touch screen that may perform the above-described display function and an operation input function. Here, the button may be various types of buttons such as a mechanical button, a touch pad, and a wheel formed in any region such as a front surface portion, a side surface portion, or a rear surface portion of a body appearance of the electronic apparatus 100.

The I/O interface 155 may be one of a high definition multimedia interface (HDMI), a mobile high-definition link (MHL), a USB, DisplayPort (DP), a thunderbolt, a video graphics array (VGA) port, an RGB port, a D-subminiature (D-SUB), or a digital visual interface (DVI).

The HDMI is an interface capable of performing high-performance data transmission for an audio/video (AV) device inputting and outputting an audio signal and a video signal. The DP is an interface capable of implementing a full HD screen, a screen with an ultrahigh definition such as 2560×1600 or 3840×2160, and a stereographic 3D image, and transferring a digital voice. The thunderbolt is an I/O interface for high-speed data transmission and connection, and all of a personal computer (PC), a display, a storage device, and the like may be connected in parallel with one port.

The I/O interface 155 may input and output at least one of an audio signal or a video signal.

According to an implementation example, the I/O interface 155 may include a port for inputting and outputting only an audio signal and a separate port for inputting and outputting only a video signal, or may include one port for inputting and outputting both of the audio signal and the video signal.

The electronic apparatus 100 may be implemented by an apparatus that does not include a display and transmit a video signal to a separate display apparatus.

The electronic apparatus 100 may transmit a speech signal received from the external device to an external server for speech recognition.

In this case, communication modules for communication with the external device and the external server may be implemented as one module. Both of the communication modules for communication with the external device and the external server may be, for example, the Wi-Fi module.

The communication modules for communication with the external device and the external server may be implemented as separate modules. For example, communication with the external device may be performed by using the Bluetooth module and communication with the external server may be performed by using an Ethernet modem or the Wi-Fi module.

The electronic apparatus 100 may additionally include the microphone 170. For example, the microphone 170 may be formed integrally with the electronic apparatus 100 at an upper side, a front surface, a side surface, or the like, of the electronic apparatus 100. The microphone 170 may receive sound in an activated mode. The microphone 170 may include various components such as a microphone collecting sound such as user speech in analog form, an amplifier circuit amplifying the collected user speech, an A/D conversion circuit sampling the amplified user speech and converting the user speech into a digital signal, and a filter circuit removing a noise component from the digital signal obtained by the conversion.

The microphone 170 is a component for receiving a user speech or other sounds and converting the user speech or other sounds into audio data. In this case, the microphone 170 may convert the received analog user speech signal into a digital speech signal and transmit the digital speech signal to the electronic apparatus 100.

According to an embodiment, the electronic apparatus 100 may transmit the received digital speech signal to a speech recognition server. In this case, the speech recognition server may convert the digital speech signal into text information by using a speech to text (STT) function. In this case, the speech recognition server may transmit text information to another server or another electronic apparatus to perform a search based on the text information, or may directly perform a search as needed.

According to another embodiment, the electronic apparatus 100 may convert the digital speech signal by directly applying the STT function to the digital speech signal and transmit the converted text information to the external server.

The speaker 180 may be a component outputting various notification sounds, an audio message, or the like, as well as various audio data processed by the I/O interface 155.

The electronic apparatus 100 may additionally include a movement interface 190 to control movement of the electronic apparatus 100. For example, the movement interface 190 may include a motor controller 192 and a motor 194. The motor 194 may be an electric motor, such as a DC motor. The motor controller 192 may control the motor 194. For example, the motor controller 192 may control a speed, a direction and a torque of the motor 194. The motor 194 may include a plurality of motors. The motor controller 192 may independently control the speed, direction and torque of each of the plurality of motors 194. The speed, direction and torque may be controlled according to a traveling state identified by the electronic apparatus.

The electronic apparatus 100 does not necessarily include all the components illustrated in FIG. 2, and may be constituted by only some of the components according to an implementation example.

Figure 3:
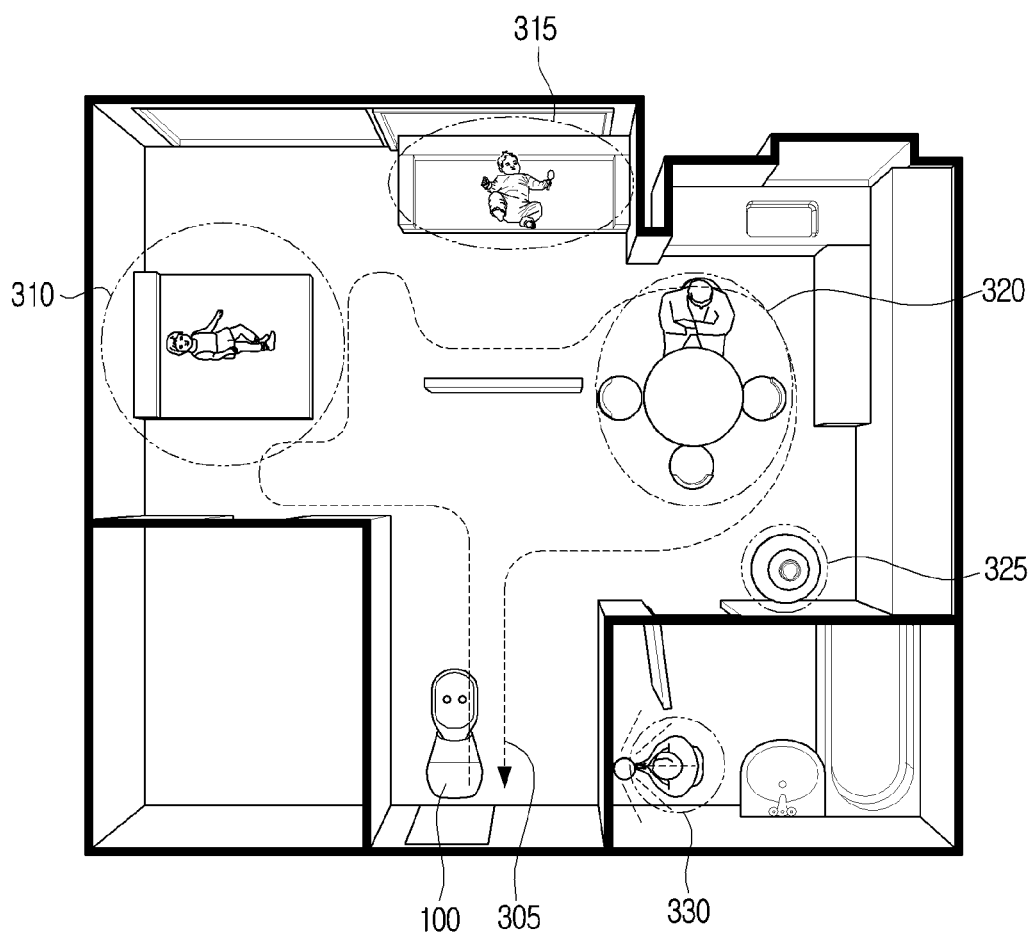
FIG. 3 is a view for describing a route along which the electronic apparatus moves in an indoor space according to an embodiment.

FIG. 3 is a view for describing a route along which the electronic apparatus moves in an indoor space according to an embodiment.

Referring to FIG. 3, the electronic apparatus 100 may analyze an image of a surrounding space captured by using the camera 120 and set a moving route 305 based on the image. The electronic apparatus 100 may travel in the surrounding space based on the moving route 305. The electronic apparatus 100 may identify various contexts while traveling based on the moving route 305. The electronic apparatus 100 may identify a context 310 that a person is lying on a bed and sleeping, a context 315 that a child is sitting on a sofa, a context 320 that a person is sitting on a chair, a context 325 that a ceramic is placed on a table, and a context 330 that a person is taking a shower.

In case that the electronic apparatus 100 identifies the person object and the bed object, the electronic apparatus 100 may obtain information that attribute information of the person object is dynamic and attribute information of the bed object is static. The electronic apparatus 100 may identify the context 310 that a person is lying on a bed and sleeping based on a relationship between the attribute information of the person object and the attribute information of the bed object.

Further, in case that the electronic apparatus 100 identifies the child object and the sofa object, the electronic apparatus 100 may obtain information that attribute information of the child object is dynamic and attribute information of the sofa object is static. The electronic apparatus 100 may identify the context 315 that a child is sitting on a sofa based on a relationship between the attribute information of the child object and the attribute information of the sofa object.

Further, in case that the electronic apparatus 100 identifies the person object and the chair object, the electronic apparatus 100 may obtain information that attribute information of the person object is dynamic and attribute information of the chair object is static. The electronic apparatus 100 may identify the context 320 that a person is sitting on a chair based on a relationship between the attribute information of the person object and the attribute information of the chair object.

Further, in case that the electronic apparatus 100 identifies a table object and a ceramic object, the electronic apparatus 100 may obtain information that attribute information of the table object and attribute information of the ceramic object are both static. The electronic apparatus 100 may identify the context 325 that a ceramic is placed on a table based on a relationship between the attribute information of the ceramic object and the attribute information of the table object. Here, the electronic apparatus 100 may identify a context by identifying information on a height at which a specific object (ceramic) is positioned. The processor 130 may identify that a context of the specific object (for example, the ceramic) is the dangerous context in case that the specific object is positioned a predetermined threshold (for example, 50 cm) or more from the floor.

Further, in case that the electronic apparatus 100 identifies the person object and the shower object, the electronic apparatus 100 may obtain information that attribute information of the person object is dynamic and attribute information of the shower object is static. The electronic apparatus 100 may identify the context 330 that a person is taking a shower based on a relationship between the attribute information of the person object and the attribute information of the shower object.

The plurality of contexts 310, 315, 320, 325, and 330 illustrated in FIG. 3 may correspond to the current context. The electronic apparatus 100 may identify the predicted context in addition to the current context. The predicted context may indicate various situations that may occur in the future based on the current context. Control operations of the electronic apparatus 100 corresponding to the current context and the predicted context will be described later with reference to FIGS. 5 to 10.

Figure 4:
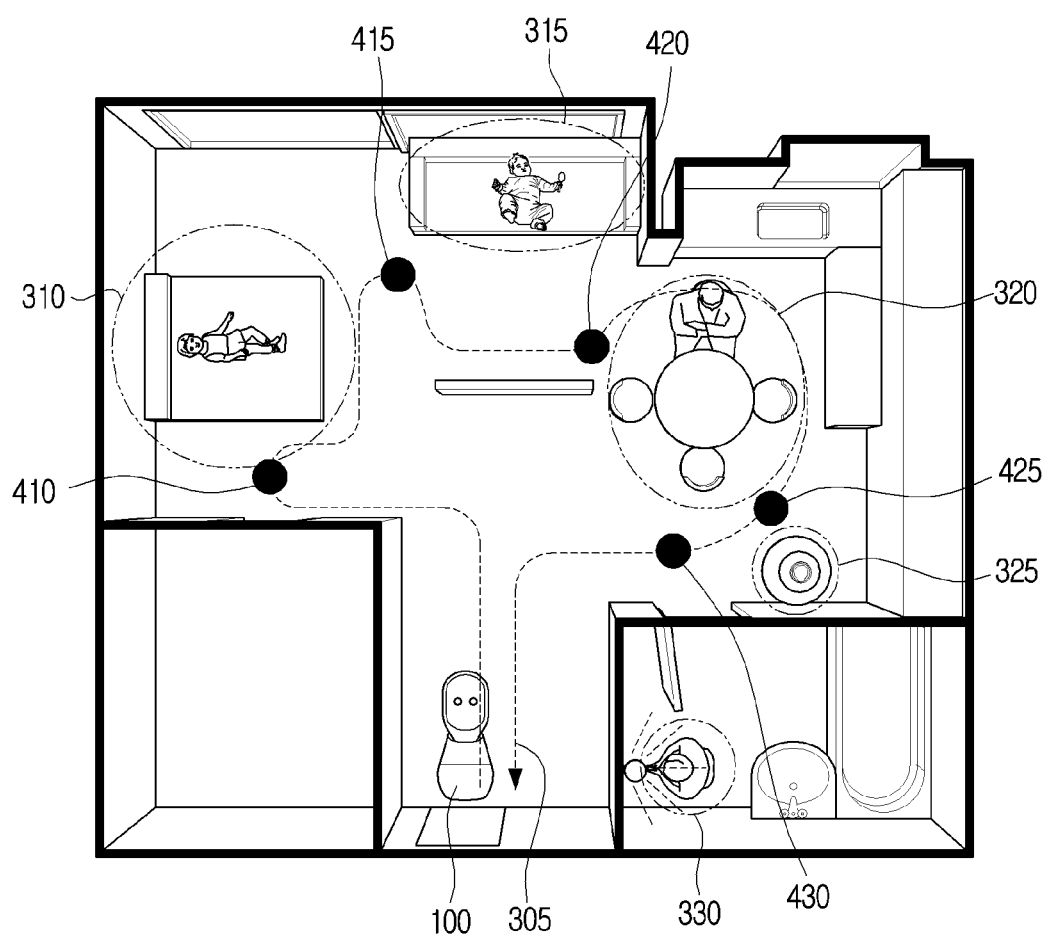
FIG. 4 is a view for describing a context identified by the electronic apparatus at a specific position in FIG. 3.

FIG. 4 is a view for describing contexts identified by the electronic apparatus at specific positions in FIG. 3.

Referring to FIG. 4, the various contexts 310, 315, 320, 325, and 330 described with reference to FIG. 3 may be identified at specific positions 410, 415, 420, 425, and 430 on the moving route 305 of the electronic apparatus 100, respectively. For example, the electronic apparatus 100 may identify at least one context at a first position 410 on the moving route 305 in consideration of the relationship between the attribution information of the person object and the attribution information of the bed object, and the environment information. Further, the electronic apparatus 100 may control the traveling state of the electronic apparatus 100 at the first position 410 based on the identified context. For example, the electronic apparatus 100 may control the electronic apparatus 100 to move to the first position 410 by moving along the moving route 305.

Figure 5:
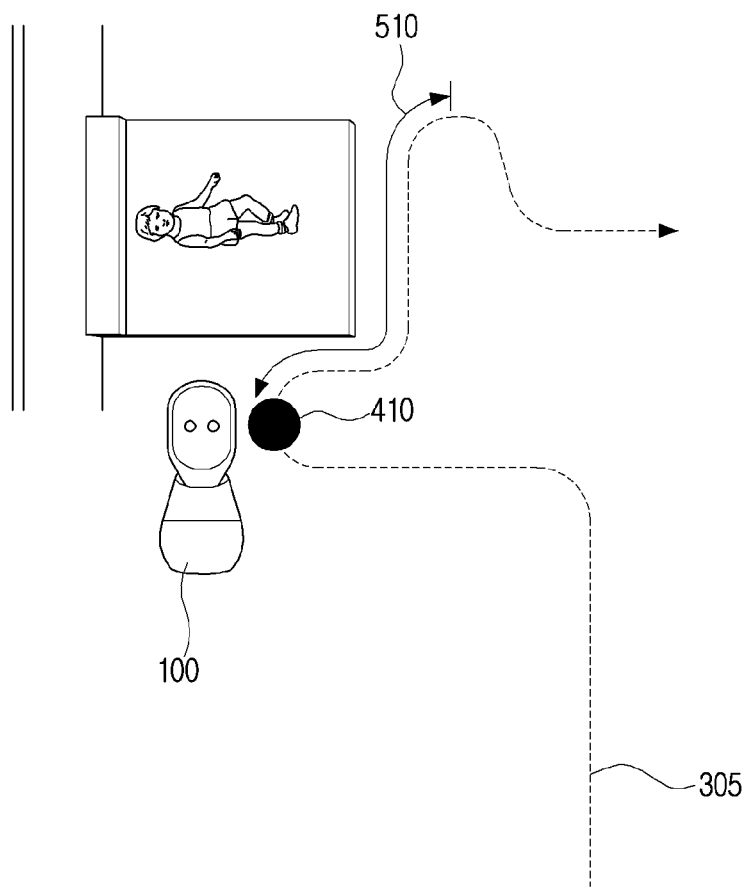
FIG. 5 is a view for describing an operation in which the electronic apparatus changes a traveling state on a specific moving route.

FIG. 5 is a view for describing an operation in which the electronic apparatus changes the traveling state on a specific moving route.

Referring to FIG. 5, the electronic apparatus 100 may identify a context that a person is sleeping on a bed based on the relationship between the person object and the bed object, and the environment information. Information on the relationship between the person object and the bed object may be information that the person uses the bed. Further, the environment information may be information on a sleeping time of the person. In case that the electronic apparatus 100 identifies a context that a person is sleeping on a bed, the electronic apparatus 100 may perform a control operation of not interrupting sleep of the person. The electronic apparatus 100 may perform a change from a basic traveling state to a low-noise traveling state in order not to interrupt sleep of the person. The low-noise traveling state may indicate an operation of reducing the RPM of the motor of the electronic apparatus 100 and an operation of lowering a moving speed of the electronic apparatus 100. According to another embodiment, the electronic apparatus 100 may perform an operation of lowering a brightness of the screen of the display included in the electronic apparatus 100 or an operation of lowering a volume of sound output from the speaker of the electronic apparatus, in order not to interrupt sleep of the person.

Here, the electronic apparatus 100 may perform a control operation of not interrupting sleep of the person while traveling along the moving 305 only in a specific section 510 on the moving route 305. The specific section 510 may be a region from the specific position where the context that a person is sleeping on a bed is identified to a position that is away from the person object by a predetermined distance, and information on the specific section 510 may be obtained by the electronic apparatus 100. According to another embodiment, the electronic apparatus 100 may set the specific section 510 by using traveling state information stored in the memory 110. The electronic apparatus 100 may store information that the traveling state of the electronic apparatus 100 is changed in the memory 110 and set the specific section 510 by using the stored information.

Figure 6:
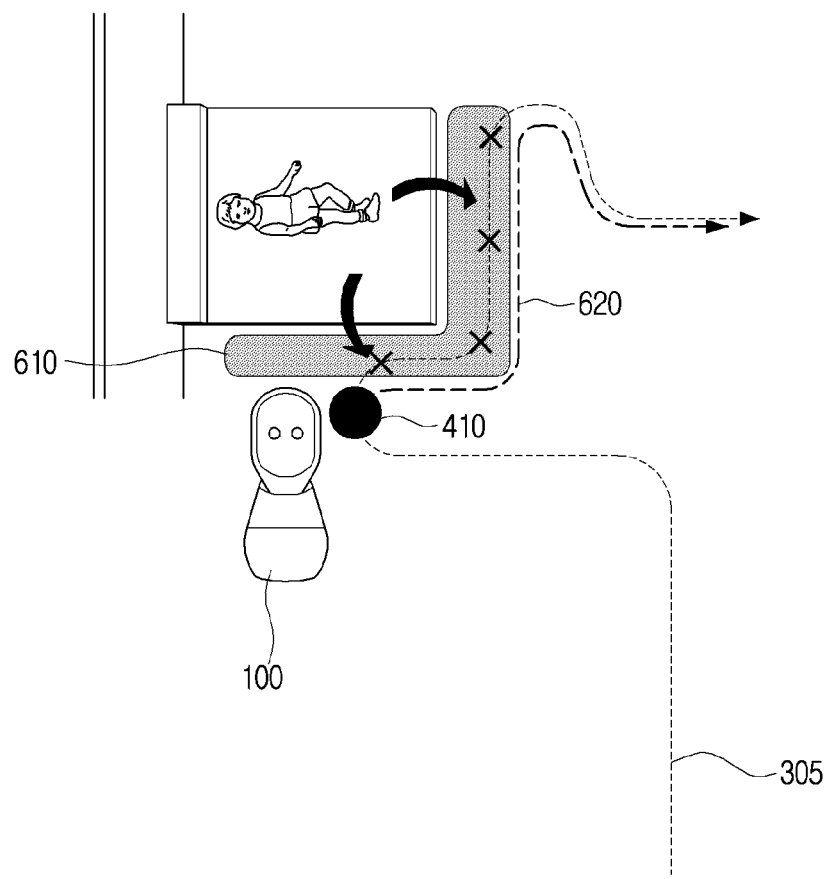
FIG. 6 is a view for describing an embodiment in which the electronic apparatus changes a moving route.

FIG. 6 is a view for describing an embodiment in which the electronic apparatus changes a moving route.

Referring to FIG. 6, the electronic apparatus 100 may identify a predicted context based on the person object and the bed object. Here, the predicted context may indicate a situation in which a person gets out from a bed. The electronic apparatus 100 may identify a space 610 where the person getting out from the bed is likely to stand based on the predicted context. Further, in case that the space 610 where the person getting out from the bed is likely to stand overlaps with the moving route 305, the electronic apparatus 100 may obtain a new traveling route 620 by excluding the moving route 305 that overlaps the space 610. The electronic apparatus 100 may control the traveling state of the electronic apparatus 100 according to the new traveling route 620 to prevent a collision with the person in advance. The electronic apparatus 100 may control the traveling state of the electronic apparatus 100 according to the predicted context to prepare for a sudden unexpected situation (a situation in which the person suddenly gets out from the bed).

Figure 7:
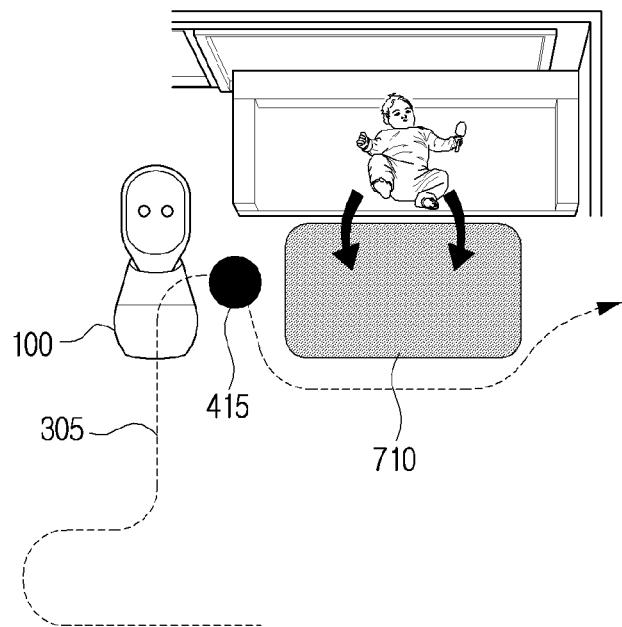
FIG. 7 is a view for describing an operation in which the electronic apparatus monitors an object at a specific position on the moving route.

FIG. 7 is a view for describing an operation in which the electronic apparatus monitors an object at a specific position on the moving route.

Referring to FIG. 7, the electronic apparatus 100 may identify a predicted context that a child may fall off a sofa based on the child object and the sofa object. Here, the electronic apparatus 100 may identify that a relationship between the child object and the sofa object may correspond to the dangerous relationship. For example, a relationship of the sofa object with the child object may correspond to the dangerous relationship, whereas a relationship of the sofa object with the adult object may not correspond to the dangerous relationship.

Further, the electronic apparatus 100 may identify a space or position 710 on which the child may fall based on the predicted context. Further, when the relationship of the sofa object and the child object is identified as the dangerous relationship, the electronic apparatus 100 may change the traveling state of the electronic apparatus 100 to perform monitoring for observation of a state of the child. Here, the electronic apparatus 100 may stop at the specific position 415 and continuously observe (monitor) the child without moving along the moving route 305. Here, in case that the electronic apparatus 100 determines that it is highly likely that the child falls off the sofa, the electronic apparatus 100 may control the speaker to output an alarm sound (warning sound).

Further, the electronic apparatus 100 may determine whether or not there is an object that may injure the child in the identified space or position 710. For example, in case that there is a water glass in the space or position 710 on which the child may fall, the electronic apparatus 100 may output an alarm sound (warning sound) through the speaker. Although the case that the electronic apparatus 100 outputs the alarm sound (warning sound) has been described in the above-described example, the disclosure is not necessarily limited thereto, and various operations that may warn of the current situation may be performed by the electronic apparatus 100. As an example, in case that the processor 130 identifies that a current situation corresponds to a predetermined context, the processor may make a call, send a message, transmit an image, or the like, to a specific user. For example, in case that it is identified that two persons are currently in a predetermined space and the predetermined space is on fire, the processor 130 may immediately send a fire message or a rescue message ("asking for rescue of two adults") to an emergency rescue center.

Figure 8:
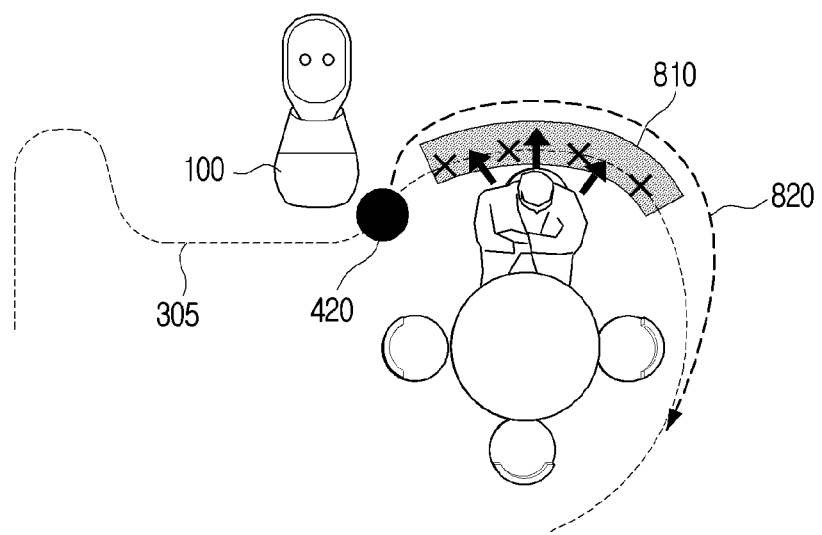
FIG. 8 is a view for describing an embodiment in which an attribute of an object is changed and the existing moving route is changed.

FIG. 8 is a view for describing an embodiment in which an attribute of an object is changed and the existing moving route is changed.

Referring to FIG. 8, the electronic apparatus 100 may identify a predicted context that a chair is moved by a person based on the person object and the chair object. The electronic apparatus 100 may identify the person object and the chair object at the specific position 420 on the moving route 305, and may change the existing moving route 305 of the electronic apparatus 100 based on the predicted context. Specifically, the electronic apparatus 100 may obtain information that attribute information of the chair object is static. Here, the electronic apparatus 100 may change the attribute information of the chair object from static to dynamic based on the relationship between the chair object and the person object. Further, the electronic apparatus 100 may determine that the chair object identified simultaneously with the person object may be moved based on the dynamic attribute. Further, the electronic apparatus 100 may identify a space range 810 or position in which the chair object may be moved. In case that the electronic apparatus 100 determines that the identified space range 810 overlaps with the existing moving route 305, the electronic apparatus 100 may set a new route 820 by excluding the overlapping portion of the existing moving route.

According to another example, it is assumed that two adults and one child are sitting on dining chairs at 8 a.m., and one chair is empty. The electronic apparatus 100 may identify that two adults and one child are currently sitting on the dining chairs by using at least one of the camera, the microphone, the ultrasonic sensor, or the frequency sensor. Further, the electronic apparatus 100 may identify that 8 a.m. is a meal time based on the environment information. The electronic apparatus 100 may identify that three persons are currently having a meal and identify a predicted context that the chairs are to be moved after the meal, based on the relationship between the person object and the chair object, and the environment information. The electronic apparatus 100 may determine a degree of danger of the predicted context in consideration of the number of times of the electronic apparatus 100 has been in a collision with the chair, an occurrence frequency, and a degree of damage at the time of occurrence. The electronic apparatus 100 may obtain the number of times of collision, an occurrence frequency, and a degree of damage at the time of occurrence based on past behavior history information. The number of times of collision may indicate the number of times of collision between the electronic apparatus 100 and the chair, and may indicate a possibility of collision. The occurrence frequency may be information indicating how many times the collision occurs during a certain period. The degree of damage may indicate a degree of damage to the electronic apparatus 100 or the chair at the time of collision. The electronic apparatus 100 may obtain a degree of danger of each of the plurality of chairs, separately. Further, the electronic apparatus 100 may perform a control operation corresponding to a degree of danger of each chair. For example, the electronic apparatus 100 may identify that a degree of danger of a context corresponding to a chair on which an adult is sitting is 10, a degree of danger of a context corresponding to a chair on which a child is sitting is 8, and a degree of danger of a context corresponding to an empty chair is 3. Further, the electronic apparatus 100 may set the new route 810 to keep away from a chair on which an adult is sitting by 100 cm, to keep away from a chair on which a child is sitting by 50 cm, and to keep away from an empty chair by 20 cm. The electronic apparatus 100 may control the electronic apparatus 100 to move along the new traveling route 810. The above-described route setting operation may be automatically performed by the electronic apparatus 100.

Figure 9:
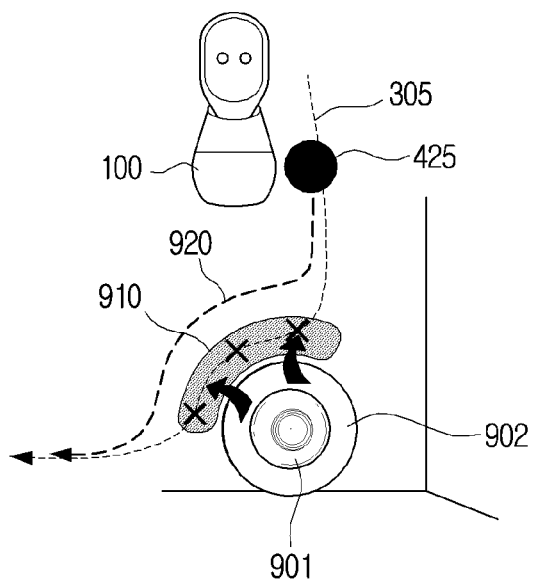
FIG. 9 is a view for describing an embodiment in which the existing moving route is changed depending on an attribute of an object.

FIG. 9 is a view for describing an embodiment in which the existing moving route is changed depending on an attribute of an object.

Referring to FIG. 9, the electronic apparatus 100 may identify a ceramic object 901 and a table object 902 having one leg at the specific position 425. Here, it is assumed that attribute information indicating that the ceramic object 901 is fragile is stored in the memory 110. The electronic apparatus 100 may identify a predicted context that a ceramic may be broken even with a small impact based on a relationship between the ceramic object 901 and the table object 902 having one leg. Here, a relationship of the ceramic object 901 with the table object 902 having one leg may correspond to the dangerous relationship. However, a relationship of the ceramic object 901 with a table object having two or more legs may not correspond to the dangerous relationship.

In case that the electronic apparatus 100 identifies the ceramic object 901 and the table object 902 having one leg, the electronic apparatus 100 may identify a space 910 or position on which the ceramic object 901 may fall. Further, in case that the electronic apparatus 100 identifies that the space 910 on which the ceramic object 901 may fall overlaps with the existing moving route 305, the electronic apparatus 100 may set a new traveling route 920 by excluding an overlapping portion of the existing moving route 305 and the space 910 on which the ceramic object 901 may fall. The electronic apparatus 100 may control the electronic apparatus 100 to move along the new traveling route 920. Further, the electronic apparatus 100 may output a message or an alarm sound for warning of a damage of the ceramic.

Figure 10:
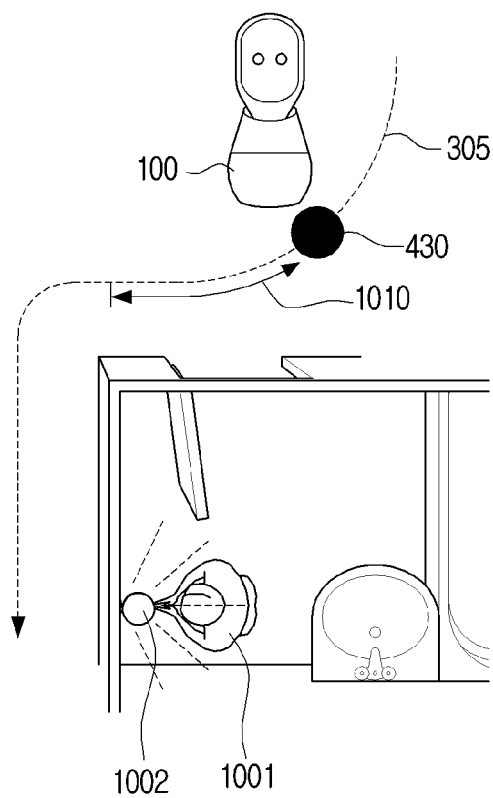
FIG. 10 is a view for describing an operation in which the electronic apparatus changes a traveling state on a specific moving route.

FIG. 10 is a view for describing an operation in which the electronic apparatus changes the traveling state on a specific moving route.

Referring to FIG. 10, the electronic apparatus 100 may identify a current context that a person is taking a shower based on a person object 1001 and a shower object 1002 at the specific position 430. Here, the electronic apparatus 100 may identify a context that a person is currently located in a bathroom (or shower room) based on the shower object 1002. Further, information indicating that the bathroom (or shower room) corresponds to a personal space (private space) may be included in the environment information (space information). The electronic apparatus 100 may obtain a private protection context in consideration of a relationship between the person object 1001 and the shower object 1002, and the environment information.

In case that the electronic apparatus 100 recognizes the private protection context, the electronic apparatus 100 may change the traveling state of the electronic apparatus 100 in a specific section 1010 on the existing moving route 305. Here, the electronic apparatus 100 may turn off the camera or temporarily stop the image capturing operation in the specific section 1010 for private protection while continuing to control movement of the electronic apparatus 100 along the moving route 305. Here, the specific section 1010 may indicate a section in which the electronic apparatus 100 may identify the private protection context. According to another embodiment, information on the specific section 1010 may be stored in the memory 110. The electronic apparatus 100 performs a control operation according to the private protection context, and thus it is possible to obtain an effect of protecting privacy of individuals.

Referring to FIG. 10, a relationship of the shower object 1002 with the adult object may correspond to a private protection relationship. However, a relationship of the shower object 1002 with a child (or a specific person object) may not correspond to the private protection relationship. For example, there may be a context that an observation of showering of a child or a patient who needs care is required. Therefore, even in case that the shower object 1002 is identified, the electronic apparatus 100 may obtain a different context depending on a different relationship of the object.

FIG. 11 is a view for describing an operation in which the electronic apparatus stores information on a member.

Referring to FIG. 11, according to another embodiment, the electronic apparatus 100 may store information on a member in the memory 110 based on a predetermined space. Here, the predetermined space may indicate a limited space in which the electronic apparatus 100 is operated, such as a house or a company. The member may indicate a dynamic object that is repeatedly recognized in the predetermined space, and the dynamic object may be a person or a pet.

As an example, the electronic apparatus 100 may set a house as the predetermined space and may set an adult male 1101, an adult female 1102, an adolescent female 1103, a male child 1104, and a pet 1105 as members of the predetermined space. Further, the electronic apparatus 100 may store unique characteristic information of each member, such as a name, an age, a sex, a height, a face, a fingerprint, an appearance, a voice, or the like, of each member in the memory 110. The electronic apparatus 100 may identify whether or not a member is present in the predetermined space and which position the member is located in the predetermined space by using the unique characteristic information of each member.

Further, the electronic apparatus 100 may continuously monitor position information of each member and control the traveling state of the electronic apparatus 100 based on the position information of each member. For example, in case that the electronic apparatus 100 identifies that all of the members stored in the memory 110 are not present in the predetermined space, the electronic apparatus 100 may perform a specific control operation in the predetermined space. As an example, the electronic apparatus 100 may perform a cleaning operation or perform an operation of controlling a system to interrupt indoor power supply based on the information that all of the members are not present in the predetermined space. As another example, it is assumed that the adolescent female 1103 and the adult female 1102 are present in the predetermined space. The electronic apparatus 100 may identify a position of the adult female 1102 to report information on the adolescent female 1103 to the adult female 1102. The electronic apparatus 100 may analyze a behavior history to estimate the position of the adult female 1102 and may move to a position where the adult female 1102 is most frequently located at a current time.

Figure 12:
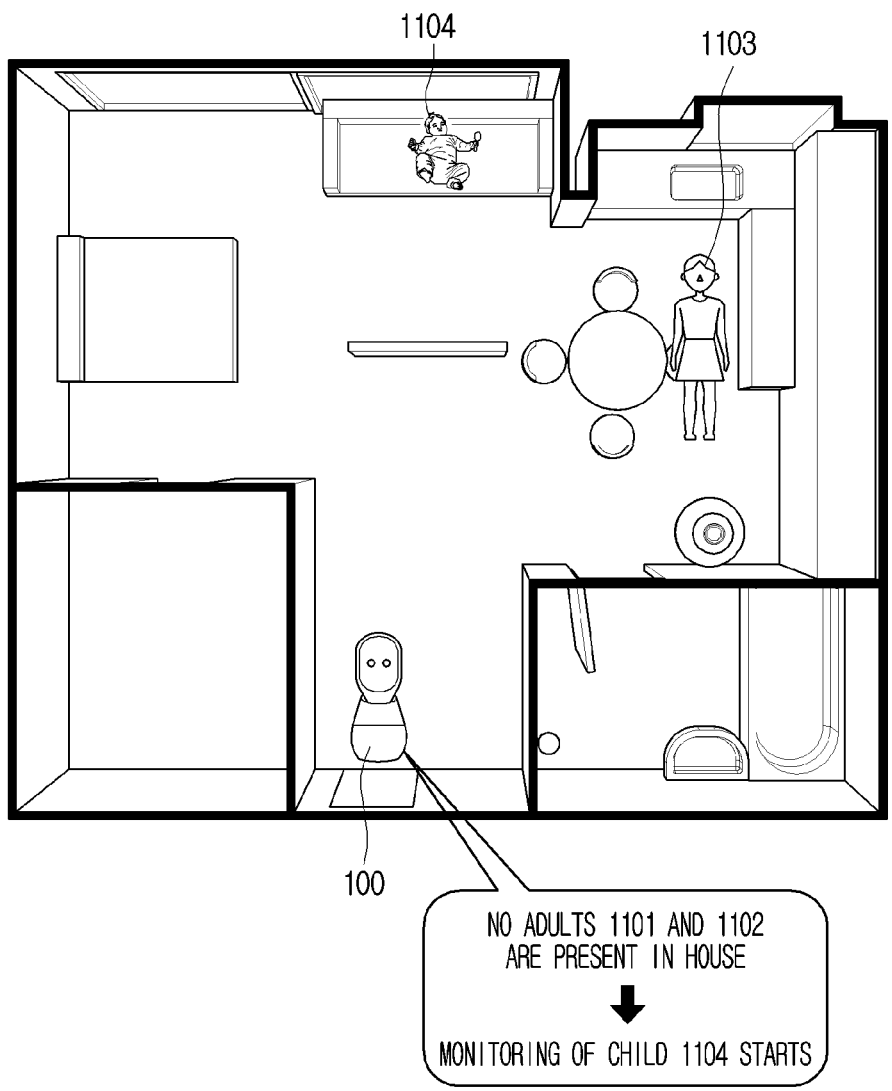
FIG. 12 is a view for describing an embodiment in which the electronic apparatus identifies a presence or absence of a member and performs a control operation corresponding to an identification result.

FIG. 12 is a view for describing an embodiment in which the electronic apparatus identifies a presence or absence of a member and performs a control operation corresponding to an identification result.

Referring to FIG. 12, the electronic apparatus 100 may identify whether or not each member stored in the memory 110 is present in a predetermined space. As in the embodiment illustrated in FIG. 11, it is assumed that the electronic apparatus 100 sets a house as the predetermined space and sets the adult male 1101, the adult female 1102, the adolescent female 1103, the male child 1104, and the pet 1105 as members of the predetermined space. Here, the electronic apparatus 100 may identify that the adult male 1101 and the adult female 1102 correspond to protectors or adults. Further, the electronic apparatus 100 may identify the child 1104 as a target to be protected. In case that the electronic apparatus 100 identifies that the target to be protected is present in the predetermined space and the protector is not present in the predetermined space, the electronic apparatus 100 may change the traveling state of the electronic apparatus 100 to monitor the target to be protected. For example, in case that the electronic apparatus 100 identifies that the objects 1101 and 1102 corresponding to adults are not present in the house, and only the child 1104 and the adolescent female 1103 are present in the house, the electronic apparatus 100 may control itself to be located proximate the child 1104 to intensively monitor the child 1104.

Figure 13:
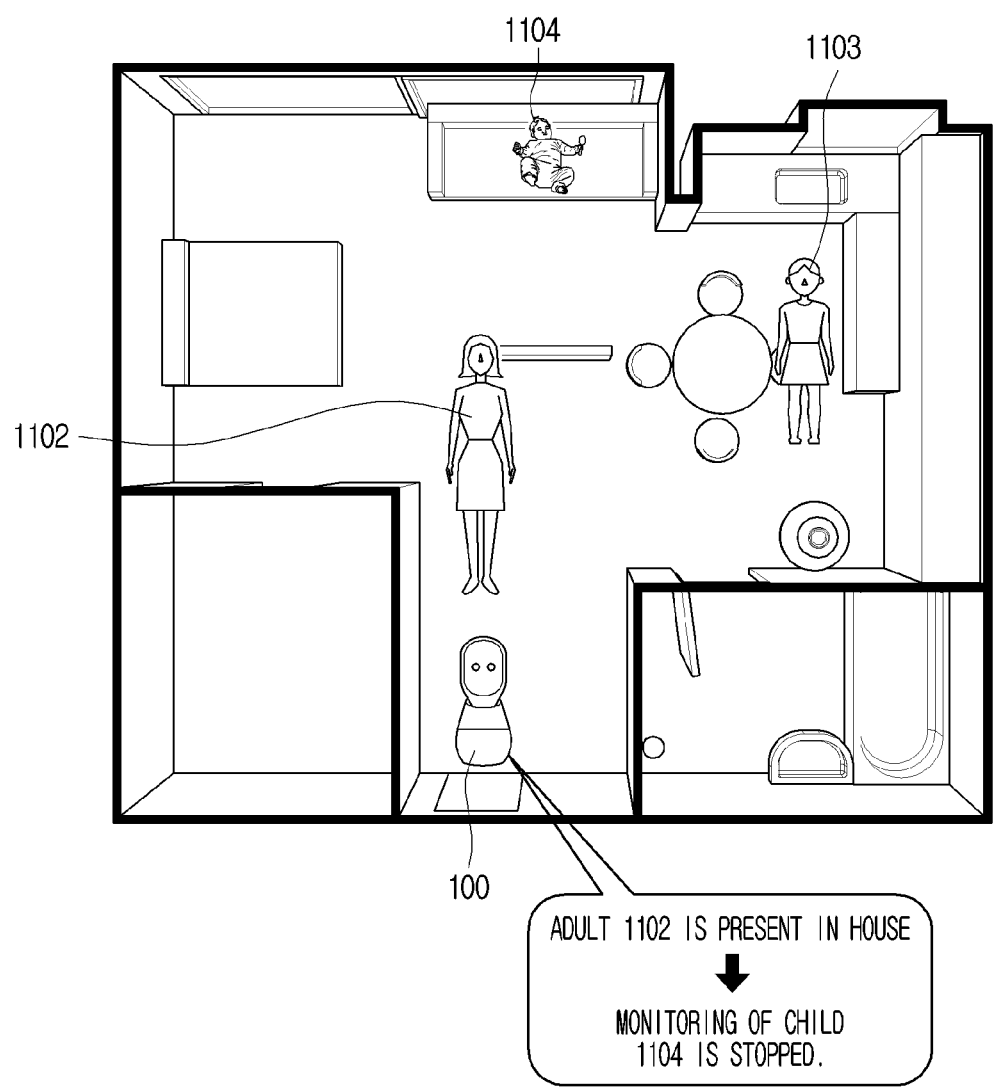
FIG. 13 is a view for describing another embodiment in which the electronic apparatus identifies a presence or absence of a member and performs a control operation corresponding to an identification result.

FIG. 13 is a view for describing another embodiment in which the electronic apparatus identifies a presence or absence of a member and performs a control operation corresponding to an identification result.

Referring to FIG. 13, the electronic apparatus 100 may identify a member entering the predetermined space and control the traveling state of the electronic apparatus 100. It is assumed that the electronic apparatus 100 monitors the target to be protected, child 1104, according to the embodiment illustrated in FIG. 12. Here, in case that the electronic apparatus 100 newly recognizes that the protector is present in the predetermined space, the electronic apparatus 100 may not monitor the target to be protected. For example, it is assumed that the protector 1102 enters the house in a state in which the electronic apparatus 100 monitors the child 1104 due to the absence of the protector (or adult). Once the electronic apparatus 100 recognizes the protector 1102 entering the house, the electronic apparatus 100 may stop the operation of monitoring the child 1104.

The electronic apparatus 100 may control the traveling state of the electronic apparatus 100 by using a relationship between the child 1104 to be protected and the protector. According to another example, in case that the electronic apparatus 100 identifies that the target to be protected and an adult object who is not the protector are present in the predetermined space, the electronic apparatus 100 may continue to monitor the target to be protected. Although the adult object is an adult, the adult object does not serve as the protector in the relationship with the target to be protected.

Figure 14:
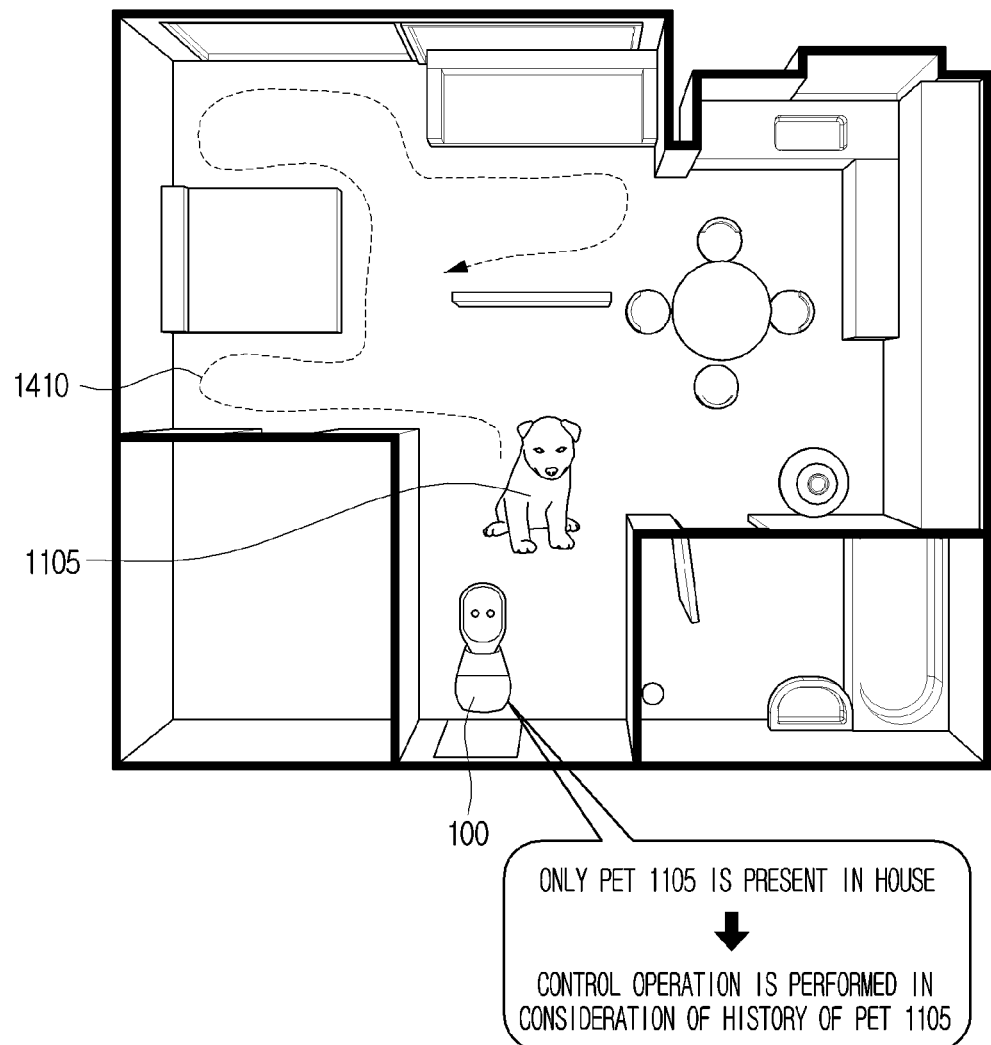
FIG. 14 is a view for describing an operation in which the electronic apparatus sets a moving route based on information on movement of a member.

FIG. 14 is a view for describing an operation in which the electronic apparatus sets a moving route based on information on movement of a member.

Referring to FIG. 14, the electronic apparatus 100 may control the traveling state of the electronic apparatus 100 based on history information of a member. As an example, the electronic apparatus 100 may store a moving route of a member. The electronic apparatus 100 may identify a main moving route by analyzing moving route history of the member. Further, the electronic apparatus 100 may set a moving route of the electronic apparatus 100 by considering the main moving route of the member. In case that the electronic apparatus 100 identifies that the member is present in the predetermined space, the electronic apparatus 100 may set a moving route of the electronic apparatus 100 to avoid the main moving route of the member stored in the memory 110 in order not to interrupt the main moving route of the member.

For example, it is assumed that a main moving route 1410 is stored in the memory 110 as one of history information of the pet 1105. The electronic apparatus 100 may control the traveling state of the electronic apparatus 100 to avoid the main moving route 1410 of the pet 1105. Specifically, the electronic apparatus 100 may set the basic traveling route of the electronic apparatus 100 not to overlap with the main moving route 1410 of the pet 1105. The electronic apparatus 100 may control the electronic apparatus 100 to move within the predetermined space while avoiding the main moving route 1410.

According to another example, the electronic apparatus 100 may control the traveling state of the electronic apparatus 100 in consideration of the main moving route of the pet 1105 only in case that the electronic apparatus 100 identifies that the pet 1105 is present in the house and the members other than the pet 1105 are not present in the house. The electronic apparatus 100 may identify that the pet 1105 moves along with a specific member rather than moving along the main moving route in case that the specific member other than the pet 1105 is present in the house. Therefore, the electronic apparatus 100 may control the traveling state of the electronic apparatus 100 in consideration of a relationship of the pet 1105 with another object, in addition to the main moving route 1410 the pet object 1105.

According to another example, the electronic apparatus 100 may store a specific time interval in which the pet 1105 moves along the main moving route 1410 as the environment information. For example, the electronic apparatus 100 may identify that the pet 1105 moves along the main moving route only in a time interval from 8 a.m. to 8 p.m. Specifically, in case that the electronic apparatus 100 identifies that the pet 1105 is present in the house from 8 a.m. to 8 p.m., the electronic apparatus 100 may set a new traveling route of the electronic apparatus 100 to avoid the main moving route 1410 of the pet.

Figure 15:
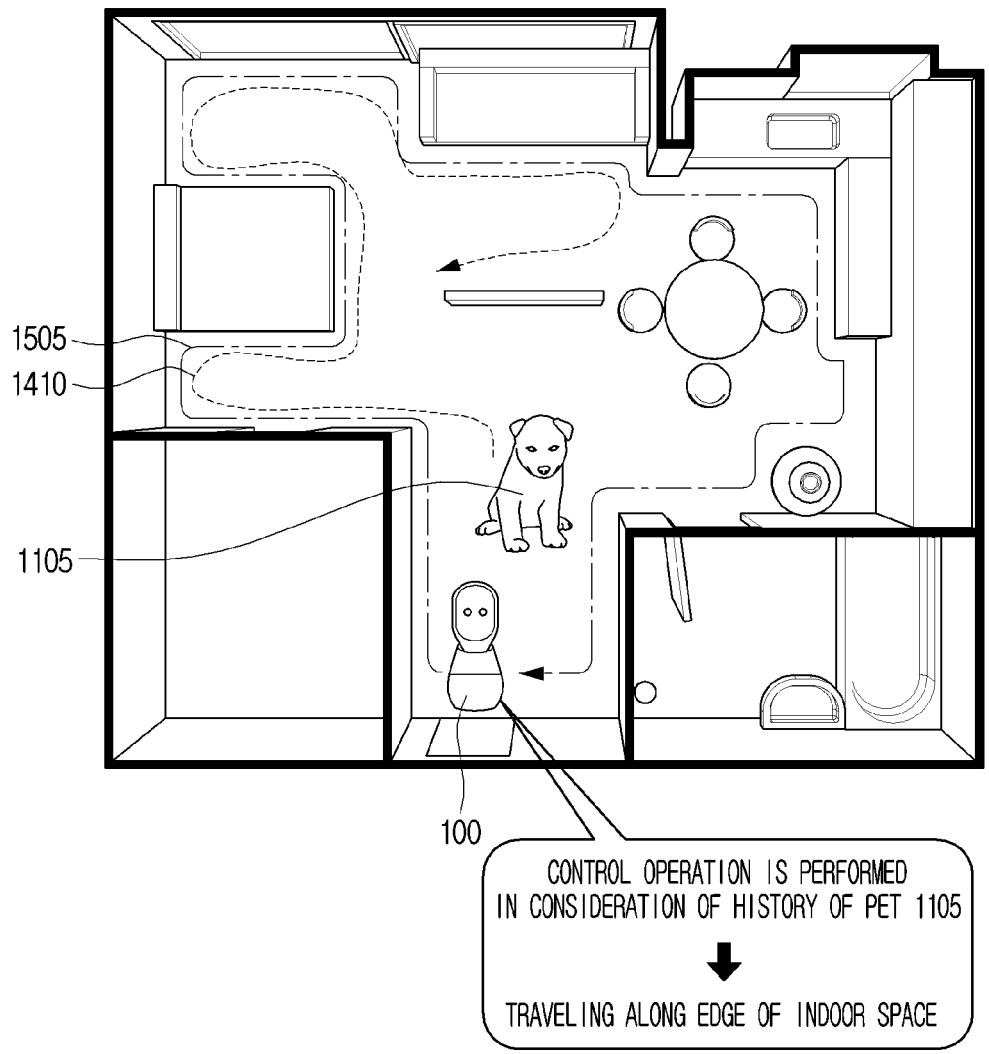
FIG. 15 is a view for describing an operation in which the electronic apparatus sets a moving route to avoid a collision with a member.

FIG. 15 is a view for describing an operation in which the electronic apparatus sets a moving route to avoid a collision with a member.

Referring to FIG. 15, the electronic apparatus 100 may control the traveling state of the electronic apparatus 100 based on history information of a member. As described above with reference to FIG. 14, the electronic apparatus 100 may set a moving route of the electronic apparatus 100 to avoid a main moving route which is one of history information of the member. As an example, the electronic apparatus 100 may control the traveling state of the electronic apparatus 100 to travel along an edge of the predetermined space. Specifically, the electronic apparatus 100 may set a route for traveling along the edge of the predetermined space.

For example, it is assumed that the main moving route 1410 of the pet 1105 is stored in the memory 110. In case that the electronic apparatus 100 identifies that the pet 1105 is present in the house, the electronic apparatus 100 may set the moving route 1505 for traveling along the edge of the house.

Figure 16:
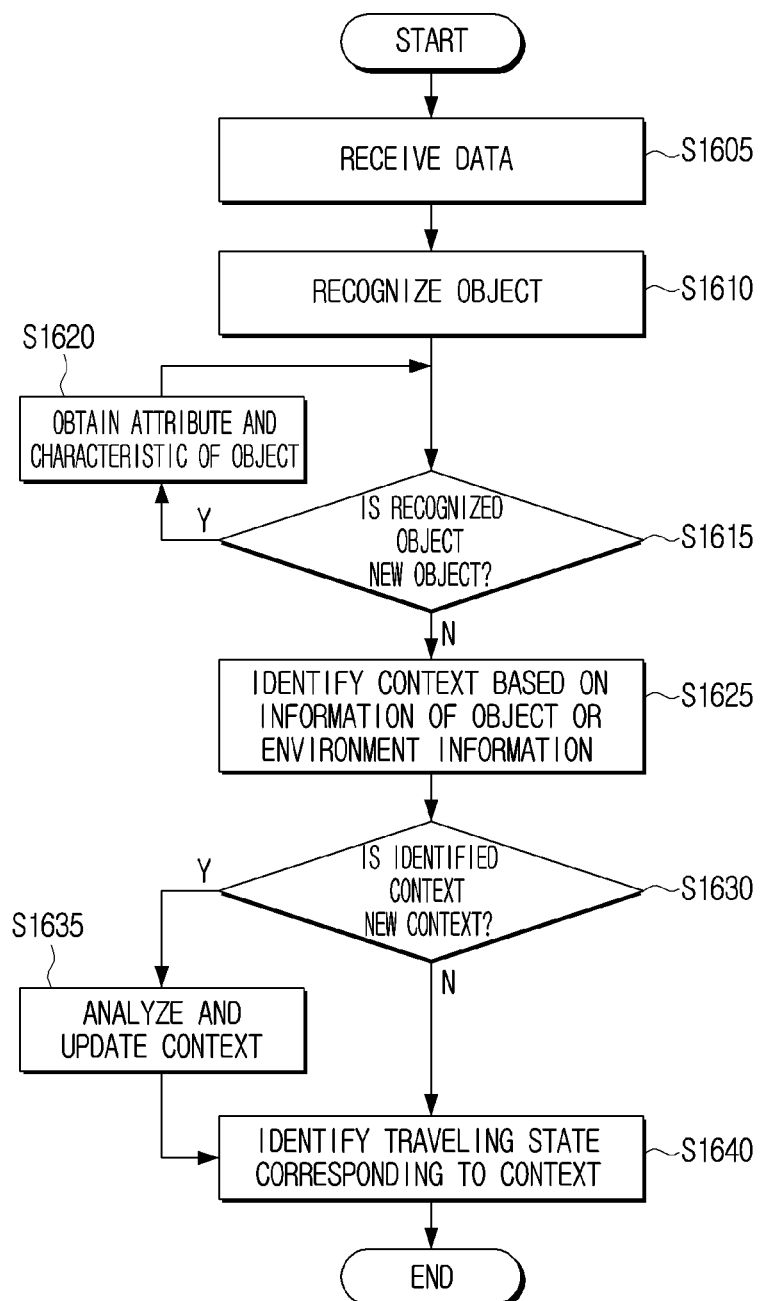
FIG. 16 is a diagram for describing a plurality of operations performed by the electronic apparatus to identify a traveling state corresponding to a context.

FIG. 16 is a diagram for describing a plurality of operations performed by the electronic apparatus to identify a traveling state corresponding to a context.

Referring to FIG. 16, the electronic apparatus 100 may receive various data required for object recognition (S1605). Here, the data may be an image obtained by the camera 120 included in the electronic apparatus 100 or may be an image received from an external device. Then, the electronic apparatus 100 may recognize an object based on the received data (S1610). Here, the electronic apparatus 100 may recognize an object by using the artificial intelligence learning model. Specifically, the electronic apparatus 100 may provide the received image data to the artificial intelligence learning model as input data, and an object corresponding to the image data may be indicated as result data obtained by using the artificial intelligence learning model. According to an embodiment, the electronic apparatus 100 may recognize the object by using the image data. According to another example, the electronic apparatus 100 may receive audio data and recognize the object by using the received audio data.

Then, the electronic apparatus 100 may identify whether or not the recognized object is a new object (S1615). The electronic apparatus 100 may identify whether or not the recognized object is a new object by determining whether or not the recognized object is a pre-stored object through comparison with data stored in the memory 110. For example, in case that the recognized object is not stored in the memory 110, the electronic apparatus 100 may determine that the recognized object is a new object. Then, in case that the recognized object is a new object, the electronic apparatus 100 may obtain an attribute and a characteristic of the object (S1620). Here, the attribute and the characteristic of the object may be directly input by the user, or information on the attribute and the characteristic of the object may be received from an external server. According to another example, the electronic apparatus 100 may analyze the received data and store the attribute and the characteristic of the object in the memory 110. Further, in S1620, an update of changed attribute information of the object or changed environment information may be performed.

In case that the electronic apparatus 100 determines that the recognized object is not a new object in S1615, the electronic apparatus 100 may identify a context based on information of the object or the environment information (S1625). The electronic apparatus 100 may use the artificial intelligence learning model to identify the context. Specifically, the electronic apparatus 100 may provide at least one of the information (attribute information) on the object or the environment information to the artificial intelligence learning model as input data, and receive result data from the artificial intelligence learning model. Here, the result data may be context information. A specific operation in S1625 will be described later with reference to FIG. 17.

Then, the electronic apparatus 100 may check (identify) whether or not the identified context is a new context (S1630). Here, in case that the identified context is a new context that is not stored in the memory 110, the electronic apparatus 100 may perform a context analysis and update operation on the new context (S1635). A specific operation in S1635 will be described later with reference to FIG. 18.

In case that the electronic apparatus 100 determines that the identified context is not a new context in S1630, the electronic apparatus 100 may identify a traveling state of the electronic apparatus 100 corresponding to the context (S1640). As an example, the electronic apparatus 100 may identify a traveling state of the electronic apparatus 100 that is suitable for the context and control the electronic apparatus 100 to be in the corresponding traveling state. A specific operation in S1640 will be described later with reference to FIG. 19.

Figure 17:
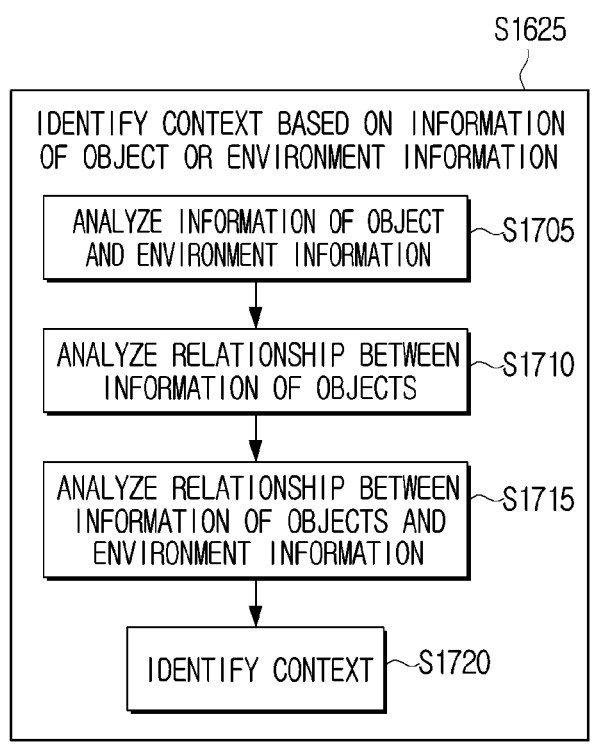
FIG. 17 is a diagram for describing an operation in which the electronic apparatus identifies a context based on information of an object or environment information.

FIG. 17 is a diagram for describing the operation in which the electronic apparatus identifies a context based on the information of the object or the environment information.

The operation in S1625 in FIG. 16 may be specified as illustrated in FIG. 17. The electronic apparatus 100 may analyze the information of the object and/or the environment information to identify the context based on the information of the object or the environment information (S1705). Then, in case that a plurality of objects are identified, the electronic apparatus 100 may analyze a relationship between information of the plurality of objects (S1710). Then, the electronic apparatus 100 may analyze a relationship between the information of the plurality of objects and the environment information (S1715). Then, the electronic apparatus 100 may identify the context based on information obtained in S1705 to S1715 (S1720).

The case that S1625 is constituted by S1705 to S1720 has been described above with reference to FIG. 17. However, one or more steps from S1705 to S1720 may be omitted. For example, the electronic apparatus 100 may determine that the context may be identified based on the information in S1710, and the electronic apparatus 100 may thereby determine to omit S1715.

Figure 18:
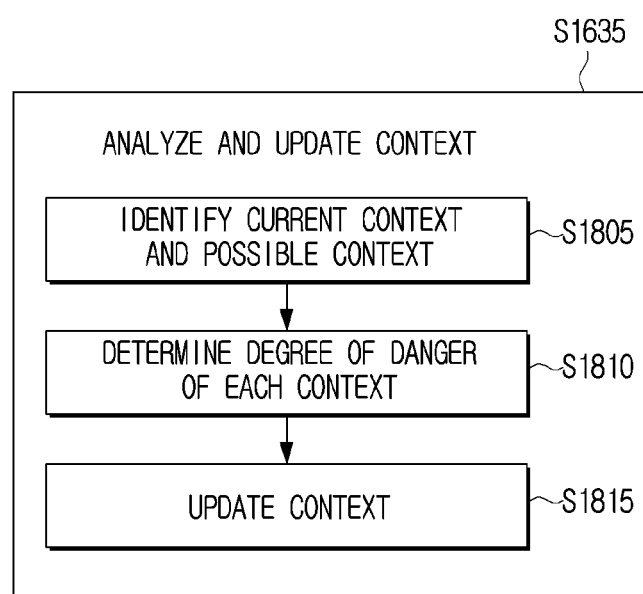
FIG. 18 is a diagram for describing an operation in which the electronic apparatus analyzes and updates a context.

FIG. 18 is a diagram for describing the operation in which the electronic apparatus analyzes and updates the context.

Referring to FIG. 18, in the analyzing and updating of the context (S1635), a current context or a possible context (predicted context) may be identified (S1805). Then, in S1635, a degree of danger of each identified context may be determined (S1810). As an example, the electronic apparatus 100 may obtain, from the user, a degree of danger (level of danger), a degree of safety (level of safety), a level of necessity of protection, and a level of necessity of observation of the new context. Here, the electronic apparatus 100 may consider a possibility of collision, a contact with a specific object, an exposure frequency, and the like, to determine the degree of danger. According to another example, the electronic apparatus 100 may obtain information on the new context from the external server. According to another example, the electronic apparatus 100 may directly analyze and thereby obtain information on the new context. Then, in S1635, information on a final context may be stored in the memory 110 to update existing context information (S1815).

Figure 19:
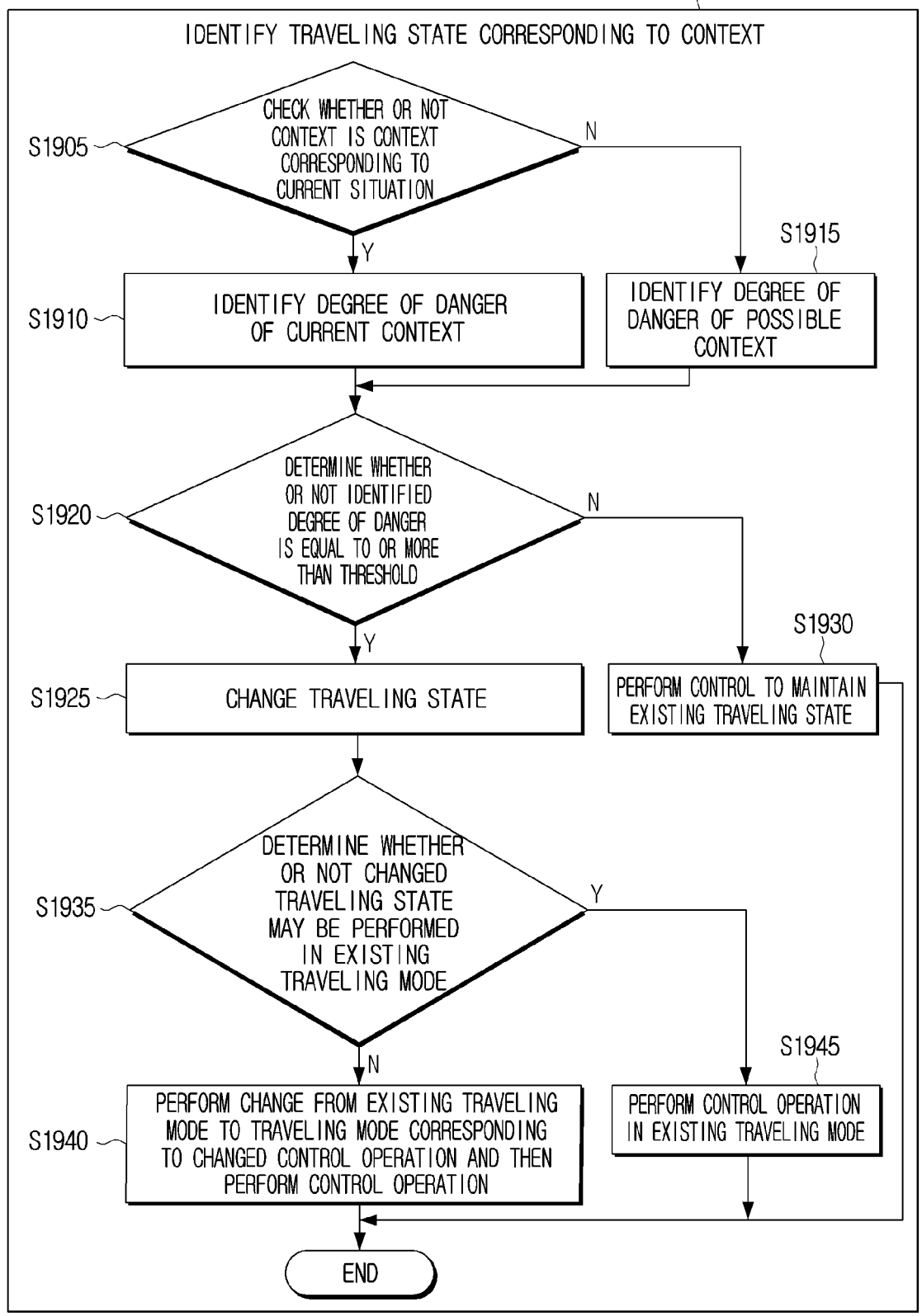
FIG. 19 is a flowchart for describing an operation in which the electronic apparatus identifies a traveling state corresponding to a context.

FIG. 19 is a flowchart for describing the operation in which the electronic apparatus identifies a traveling state corresponding to the context.

Referring to FIG. 19, in the identifying of the traveling state of the electronic apparatus 100 corresponding to the context, the electronic apparatus 100 may check (identify) whether or not the context is a context corresponding to a current situation (S1905). In case that the identified context is a context corresponding to the current situation, the electronic apparatus 100 may identify at least one of a degree of danger (level of danger), a degree of safety (level of safety), a level of necessity of protection, or a level of necessity of observation of the current context (S1910). In case that the identified context is a possible context, the electronic apparatus 100 may identify at least one of a degree of danger (level of danger), a degree of safety (level of safety), a level of necessity of protection, or a level of necessity of observation of the predicted context (S1915). The degree of danger and the like may vary depending on whether the identified context is a context corresponding to a current situation or a context corresponding to a possible situation. For example, a situation in which a child falls off a sofa is assumed. In case of the current context, a degree of danger of the situation in which the child falls off the sofa may be set to 100. In case of the predicted context (possible context), a degree of danger of the situation in which the child falls off the sofa may be set to 50. Even in case of the same context, a different degree of danger may be obtained depending on whether the situation is a current situation or a possible situation.

In S1640, the electronic apparatus 100 may determine whether or not the identified degree of danger is equal to or more than a threshold after obtaining information on the degree of danger (S1920). Here, the threshold may indicate a predetermined value, and may be changed according to a setting of the user. In case that it is determined in S1920 that the obtained degree of danger is not equal to or more than the threshold, the electronic apparatus 100 may perform a control to maintain the existing traveling state of the electronic apparatus 100 (S1930).

In case that it is determined in S1920 that the obtained degree of danger is equal to or more than the threshold, the electronic apparatus 100 may change the traveling state of the electronic apparatus 100 (S1925). Then, the electronic apparatus 100 may determine whether or not the changed traveling state may be performed in the existing traveling mode (S1935). In case that it is determined in S1935 that the changed traveling state may be performed in the existing traveling mode, the electronic apparatus 100 may perform a control operation corresponding to the changed traveling state in the existing traveling mode (S1945). In case that it is determined in S1935 that the changed traveling state may not be performed in the existing traveling mode, the electronic apparatus 100 may perform a change from the existing traveling mode to a traveling mode corresponding to the changed traveling state. Then, the electronic apparatus 100 may perform a control operation corresponding to the changed traveling state based on the changed traveling mode (S1940).

For example, it is assumed that the electronic apparatus 100 may be operated in a first traveling state or a second traveling state in a first mode, and may be operated in a third traveling state or a fourth traveling state in a second mode. In case that the first traveling state is the basic traveling state, and a change from the first traveling state to the second traveling state is performed, the electronic apparatus 100 may maintain the first mode. However, in case that the first traveling state is the basic traveling state, and a change from the first traveling state to the third traveling state is performed, the electronic apparatus 100 may perform a change from the first mode to the second mode.

Figure 20:
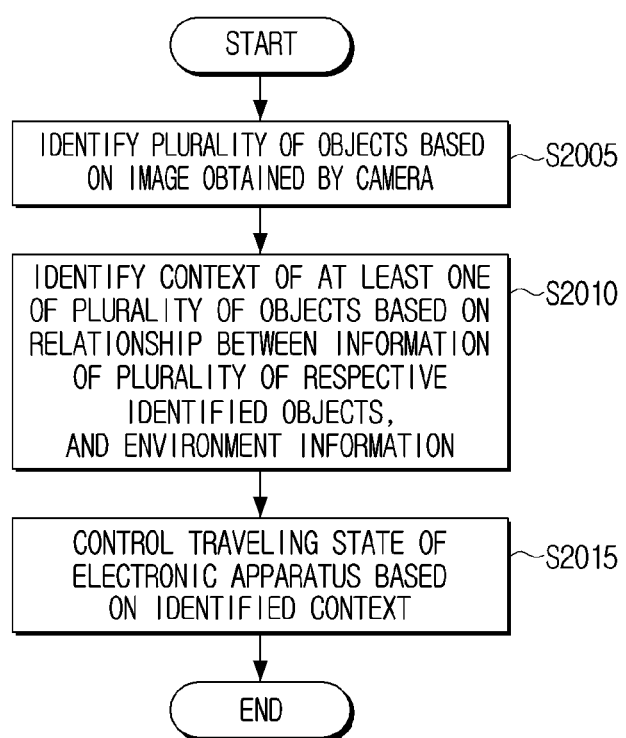
FIG. 20 is a flowchart for describing a control method of the electronic apparatus according to an embodiment.

FIG. 20 is a flowchart for describing a control method of the electronic apparatus according to an embodiment.

Referring to FIG. 20, in the control method of the electronic apparatus storing attribute information of an object and environment information related to a predetermined space according to an embodiment, a plurality of objects may be identified based on an image obtained by the camera 120 (S2005).

In the control method of the electronic apparatus 100, a context of at least one of the plurality of objects may be identified based on a relationship between attribute information of the plurality of respective identified objects, and the environment information (S2010).

In the control method of the electronic apparatus 100, the traveling state of the electronic apparatus may be controlled based on the identified context (S2015).

Here, in the controlling of the traveling state of the electronic apparatus (S2015), a level of danger of the at least one object corresponding to the identified context may be identified based on the identified context and the traveling state of the electronic apparatus may be controlled based on the identified level of danger.

Here, in the identifying of the context (S2010), a possible context of at least one of the plurality of objects may be predicted based on the relationship and the environment information, and in the controlling of the traveling state of the electronic apparatus (S2015), the traveling state of the electronic apparatus may be controlled based on the predicted context.

Further, one of the plurality of objects may be a static object having a static attribute and the other one of the plurality of objects may be a dynamic object having a dynamic attribute. Here, in the identifying of the context (S2010), at least one of a moving direction or a moving distance of the at least one of the plurality of objects may be predicted based on a relationship between the static object and the dynamic object, and the environment information, and in the controlling of the traveling state of the electronic apparatus (S2015), the traveling state of the electronic apparatus may be controlled based on at least one of the predicted moving direction or the predicted moving distance.

Further, in the identifying of the context (S2010), in case that it is identified that the dynamic object is close to the static object or is in contact with the static object, a context that the static object may be moved by the dynamic object may be identified.

Further, in the controlling of the traveling state of the electronic apparatus, a mode of the electronic apparatus may be identified based on the identified context and the mode of the electronic apparatus may include at least one of the protection mode, the low-noise mode, the monitoring mode, or the private mode.

Further, in the identifying of the context (S2010), in case that private space information is obtained from one of the plurality of objects and the other one of the plurality of objects is the dynamic object, a context of the dynamic object may be identified based on a relationship between the plurality of objects, and the private space information, and in the controlling of the traveling state of the electronic apparatus (S2015), a control may be performed to cause the electronic apparatus to be in at least one of the private mode or the low-noise mode based on the identified context.

Further, in the controlling of the traveling state of the electronic apparatus (S2015), in case that a context that one of the plurality of objects is dangerous for the other one of the plurality of objects is identified based on the relationship between the plurality of objects, a control may be performed to cause the electronic apparatus to be in at least one of the monitoring mode or the protection mode.

The control method of the electronic apparatus as illustrated in FIG. 20 may be performed on the electronic apparatus having the configuration of FIG. 1 or FIG. 2 or may be performed on an electronic apparatus having a different configuration.

The methods according to the various embodiments described above may be implemented in a form of an application that may be installed in the existing electronic apparatus.

Further, the methods according to the various embodiments described above may be implemented by performing a software upgrade or a hardware upgrade with respect to an electronic apparatus.

Further, the various embodiments of the disclosure described above may be executed through an embedded server provided in the electronic apparatus, or an external server of the electronic apparatus.

In addition, the control method of an electronic device according to the various embodiments described above may be implemented by a program to thereby be provided to the electronic apparatus. Particularly, a program including a control method of the electronic apparatus may be stored and provided in a non-transitory computer readable medium.

In a non-transitory computer readable medium storing a computer command that, in case of being executed by the processor 130 of the electronic apparatus storing attribute information of an object and environment information related to a predetermined space, causes the electronic apparatus to perform operations, the operations include: identifying a plurality of objects based on an image obtained by the camera 120; identifying a context of at least one of the plurality of objects based on a relationship between attribute information of the plurality of respective identified objects, and the environment information; and controlling a traveling state of the electronic apparatus based on the identified context.

The various embodiments described above may be implemented in a computer or a computer readable recording medium using software, hardware, or a combination of software and hardware. As an example, according to a hardware implementation, the embodiments described in the disclosure may be implemented using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, and electric units for performing other functions. In some cases, the embodiments described in the disclosure may be implemented by the processor 130 itself. According to a software implementation, the embodiments such as procedures and functions described in the disclosure may be implemented by separate software modules. Each of the software modules may perform one or more functions and operations described in the disclosure.

Computer instructions for performing processing operations of the electronic apparatus according to the various embodiments described above may be stored in a non-transitory computer-readable medium. The computer instructions stored in the non-transitory computer-readable medium allow a specific device to perform the processing operations of the electronic apparatus according to various embodiments described above when they are executed by a processor of the specific device.

The non-transitory computer-readable medium indicates a medium that semi-permanently stores data therein and is readable by the machine. A specific example of the non-transitory computer-readable medium may include a compact disk (CD), a digital versatile disk (DVD), a hard disk, a Blu-ray disk, a universal serial bus (USB), a memory card, a ROM, or the like.

Although embodiments have been illustrated and described hereinabove, the disclosure is not limited to the abovementioned specific embodiments, but may be variously modified by those skilled in the art to which the disclosure pertains without departing from the gist as disclosed in the accompanying claims. These modifications should also be understood to fall within the scope and spirit of the disclosure.

What is claimed is:

1. An electronic apparatus comprising:
a camera;
a memory storing attribute information and environment information; and
a processor configured to:
identify a plurality of objects based on an image obtained by the camera, the plurality of objects comprising a first object and a second object,
identify relationship information indicating a relationship between the first object and the second object based on first attribute information of the first object and second attribute information of the second object, wherein the relationship information indicating the relationship between the first object and the second object indicates whether the second object is movable by the first object, identify a first context of the first object based on the relationship information indicating the relationship between the first object and the second object, and the environment information, identify a first predicted context of the first object based on the relationship information indicating the relationship between the first object and the second object, and the environment information, and control a traveling state of the electronic apparatus based on the first context and the first predicted context.

2. The electronic apparatus as claimed in claim 1, wherein the processor is further configured to identify a first level of danger of the first object based on the first context and control the traveling state of the electronic apparatus based on the first level of danger.

3. The electronic apparatus as claimed in claim 1, wherein one of the plurality of objects is a static object having a static attribute, wherein another one of the plurality of objects is a dynamic object having a dynamic attribute, wherein the processor is further configured to predict at least one of a moving direction or a moving distance of at least one of the plurality of objects based on relationship information indicating a relationship between the static object and the dynamic object and the environment information, and control the traveling state of the electronic apparatus based on the at least one of the predicted moving direction or the predicted moving distance, and wherein the processor is further configured to identify, based on the dynamic object being identified as within a threshold distance of the static object, a context that the static object is movable by the dynamic object.

4. The electronic apparatus as claimed in claim 1, wherein the attribute information comprises second attribute information of a second object comprising a static attribute, and third attribute information of a third object comprising a dynamic attribute, and wherein the processor is further configured to identify, based on the third object being identified as within a threshold distance of the second object, a context that the second object is movable by the third object.

5. The electronic apparatus as claimed in claim 1, wherein the electronic apparatus is configured to operate in a protection mode, a low-noise mode, a monitoring mode, and a private mode, and wherein the processor is further configured to identify a current mode of the electronic apparatus, from among the protection mode, the low-noise mode, the monitoring mode, and the private mode, based on the first context.

6. The electronic apparatus as claimed in claim 5, wherein the processor is further configured to control the current mode of the electronic apparatus to be at least one from among the private mode or the low-noise mode based on private space information being obtained from the first object, the second object, from among the plurality of objects, being a dynamic object, and relationship information indicating a relationship between the plurality of objects and the private space information.

7. The electronic apparatus as claimed in claim 5, wherein the processor is further configured to control the current mode of the electronic apparatus to be at least one from among the monitoring mode or the protection mode based on a dangerous object, from among the plurality of objects, being identified as having a dangerous attribute and relationship information indicating a relationship between the plurality of objects.

8. The electronic apparatus as claimed in claim 1, wherein each of the plurality of objects respectively correspond to a plurality of users, wherein the attribute information comprises profile information of each of the plurality of users, and wherein the processor is further configured to identify a context of the plurality of users based on relationship information indicating a relationship between the plurality of users and the environment information, and control the traveling state of the electronic apparatus based on the context.

9. The electronic apparatus as claimed in claim 1, wherein at least one of the plurality of objects is a user, wherein an attribute of each of the plurality of objects that is the user comprises corresponding profile information of the user, and wherein the processor is further configured to identify a context of the user based on relationship information indicating a relationship between the user and other objects of the plurality of objects, the environment information and a behavior history of the user, and control the traveling state of the electronic apparatus based on the context of the user.

10. The electronic apparatus as claimed in claim 1, wherein the environment information comprises at least one of space information, time information, or position information related to a current space.

11. The electronic apparatus as claimed in claim 1, wherein the processor is further configured to identify the first context of the first object based on relationship information indicating a relationship between attribute information of each of the plurality of objects and the environment information.

12. A control method of an electronic apparatus storing attribute information of an object and environment information, the control method comprising:

identifying a plurality of objects based on an image, the plurality of objects comprising a first object and a second object;

identifying relationship information indicating a relationship between the first object and the second object based on first attribute information of the first object and second attribute information of the second object, wherein the relationship information indicating the relationship between the first object and the second object indicates whether the second object is movable by the first object;

identifying a first context of the first object based on the relationship information indicating the relationship between the first object and the second object, and the environment information;

identifying a first predicted context of the first object based on the relationship information indicating the relationship between the first object and the second object, and the environment information;

controlling a traveling state of the electronic apparatus based on the first context and the first predicted context.

13. The control method as claimed in claim 12, further comprising identifying a first level of danger of the first object based on the first context, wherein the controlling the traveling state of the electronic apparatus is based on the first level of danger.

14. The control method as claimed in claim 12, wherein one of the plurality of objects is a static object having a static attribute,
wherein another one of the plurality of objects is a dynamic object having a dynamic attribute,
wherein the control method further comprises:
identifying at least one of a moving direction or a moving distance of at least one of the plurality of objects based on relationship information indicating a relationship between the static object and the dynamic object, and the environment information; and
identifying, based on the dynamic object being identified as within a threshold distance of the static object, a context that the static object is movable by the dynamic object, and
wherein the controlling the traveling state of the electronic apparatus is based on the at least one of the predicted moving direction or the predicted moving distance.

15. The control method as claimed in claim 12, wherein the attribute information comprises second attribute information of a second object comprising a static attribute, and third attribute information of a third object comprising a dynamic attribute, and
wherein the control method further comprises identifying, based on the third object being identified as within a threshold distance of the second object, a context that the second object is movable by the third object.

16. The control method as claimed in claim 12, wherein the controlling of the traveling state of the electronic apparatus comprises identifying a current mode of the electronic apparatus based on the first context, and
wherein the current mode is selected from among a protection mode, a low-noise mode, a monitoring mode, or a private mode.

17. The control method as claimed in claim 16, wherein the identifying the first context comprises identifying whether private space information is obtained from the first object and the second object is a dynamic object, and
wherein the controlling the traveling state of the electronic apparatus comprises selecting the current mode as one from among the private mode or the low-noise mode based on the first context.

18. A non-transitory computer readable medium storing computer instructions that, when executed by a processor of an electronic apparatus storing attribute information of an object and environment information, causes the electronic apparatus to perform operations, the operations including:
identifying a plurality of objects based on an image, the plurality of objects comprising a first object and a second object;
identifying relationship information indicating a relationship between the first object and the second object based on first attribute information of the first object and second attribute information of the second object, wherein the relationship information indicating the relationship between the first object and the second object indicates whether the second object is movable by the first object;
identifying a first context of the first object based on the relationship information indicating the relationship between the first object and the second object, and on the environment information;
identifying a first predicted context of the first object based on the relationship information indicating the relationship between the first object and the second object, and the environment information;
controlling a traveling state of the electronic apparatus based on the first context and the first predicted context.

* * * * *